Aug. 23, 1966 W. J. FRY 3,267,770

DIFFERENTIAL FLUID COUPLER

Filed Oct. 27, 1961 10 Sheets-Sheet 1

Inventor
William J. Fry
By Merriam, Smith & Marshall
Attys

DIFFERENTIAL FLUID COUPLER

Filed Oct. 27, 1961 10 Sheets-Sheet 2

Inventor.
William J. Fry
By Merriam, Smith & Marshall
Attys

Inventor
William J. Fry
By Merriam, Smith & Marshall
Attys.

Inventor:
William J. Fry.

By Merriam, Smith & Marshall
Att'ys

Inventor.
William J. Fry.
By Merriam, Smith & Marshall
Attys.

Aug. 23, 1966  W. J. FRY  3,267,770

DIFFERENTIAL FLUID COUPLER

Filed Oct. 27, 1961  10 Sheets-Sheet 6

Inventor
William J. Fry,
By Merriam, Smith & Marshall
Attys.

DIFFERENTIAL FLUID COUPLER

Filed Oct. 27, 1961 10 Sheets-Sheet 7

Inventor.
William J. Fry
By Merriam, Smith & Marshall
Attys

Inventor.
William J. Fry.
By Merriam, Smith & Marshall
Att'ys.

Inventor:
William J. Fry
By Merriam, Smith & Marshall
Attys.

DIFFERENTIAL FLUID COUPLER

Filed Oct. 27, 1961 10 Sheets-Sheet 10

Inventor:
William J. Fry
By Merriam, Smith & Marshall
Attys.

United States Patent Office
3,267,770
Patented August 23, 1966

3,267,770
DIFFERENTIAL FLUID COUPLER
William J. Fry, 68 Greencroft, Champaign, Ill.
Filed Oct. 27, 1961, Ser. No. 148,164
35 Claims. (Cl. 74—751)

This application is a continuation-in-part of applicant's co-pending application Serial No. 5,494 entitled "Fluid Coupler" filed January 29, 1960, now abandoned.

This invention relates to fluid couplings and more particularly to a hydrodynamic coupling characterized by an extremely high torque transmitting characteristic.

The coupling of the invention is characterized by efficiency and effectiveness over a wide range of torque inputs and is an improvement over the patent to F. Cloete 2,453,684 dated November 9, 1948. A principal feature of the invention is the utilization of a precessional force created by gyroscopic action. The invention contemplates the provision of means for controlling the phase of the oscillating component of the flow of transfer medium in a path simultaneously rotatable about perpendicular axes in such a way that a time lag or lead is effected in the change of direction of the fluid so that a force of non-zero average value utilizable to meet torque transfer requirements is obtained.

The invention also contemplates the provision of a combined coupling and differential mechanism.

Figure 8A:
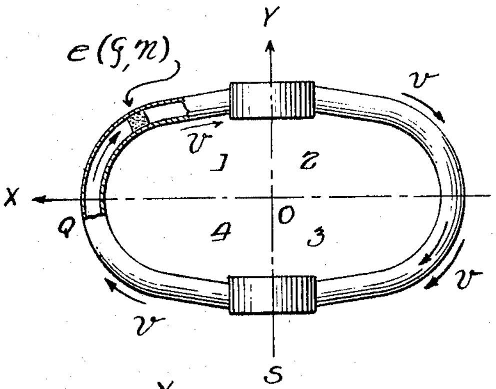
Figure 8B:
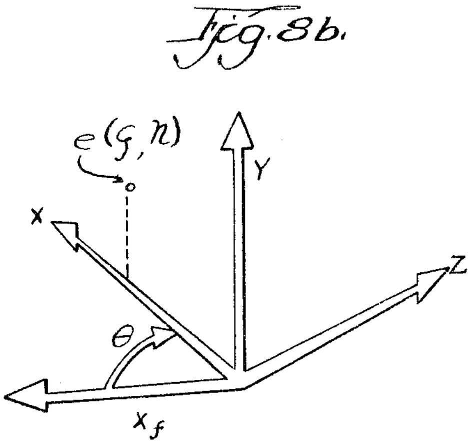
Figure 8C:
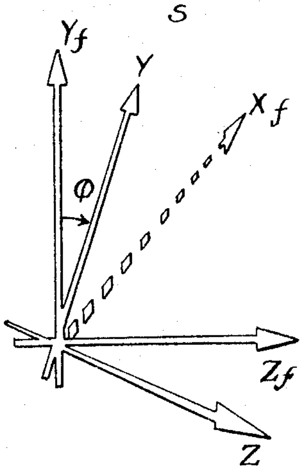
Figure 9:
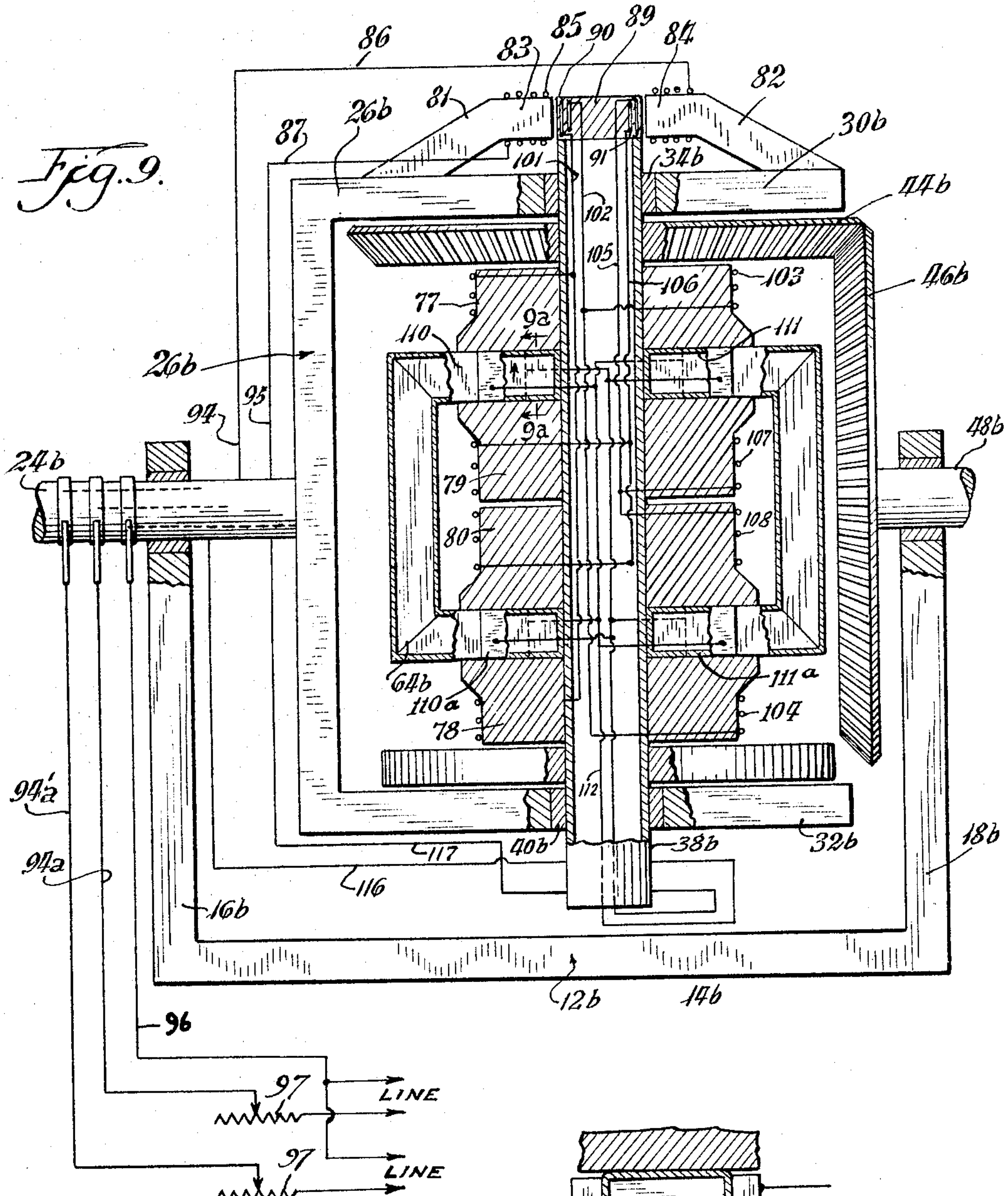
Figure 9A:
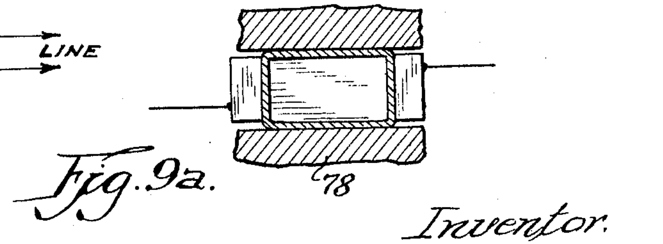
Figure 21:
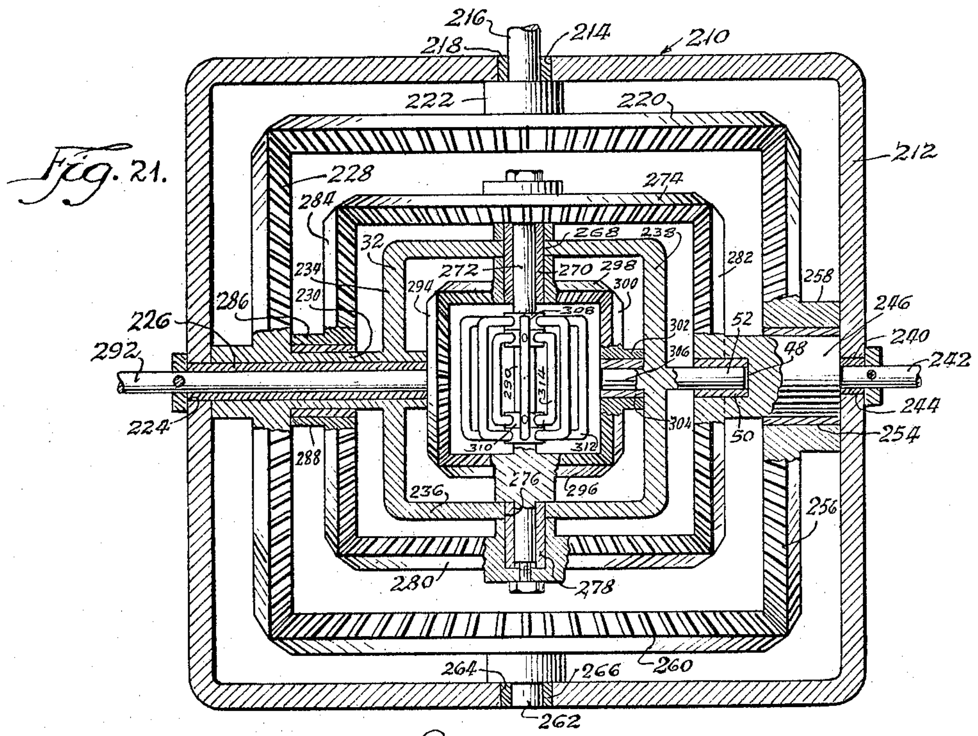
Figure 10:
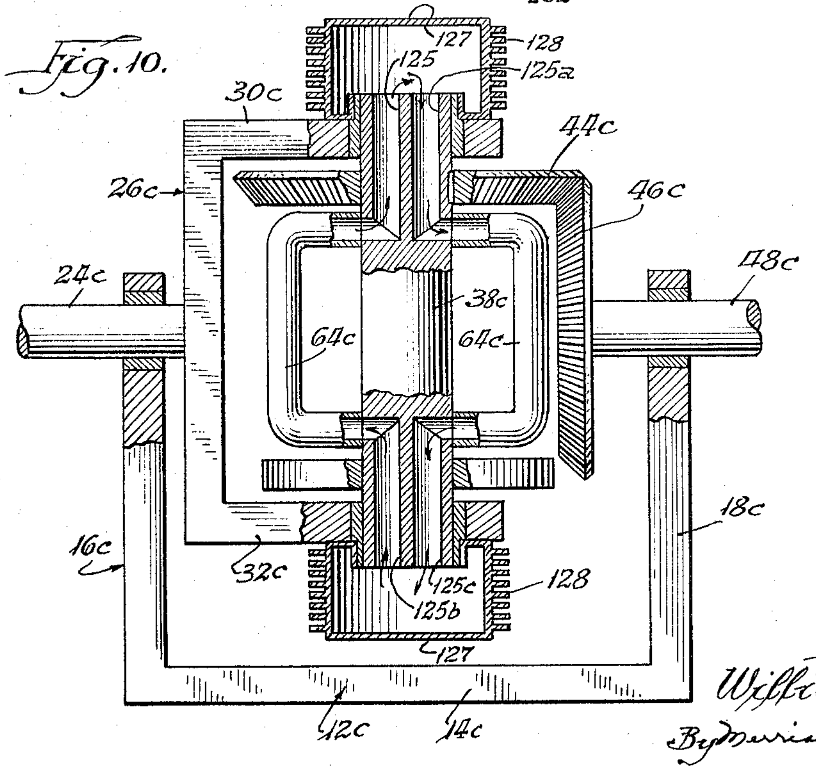
Figures 11, 12A, 12B, 13, 13A, 13B:
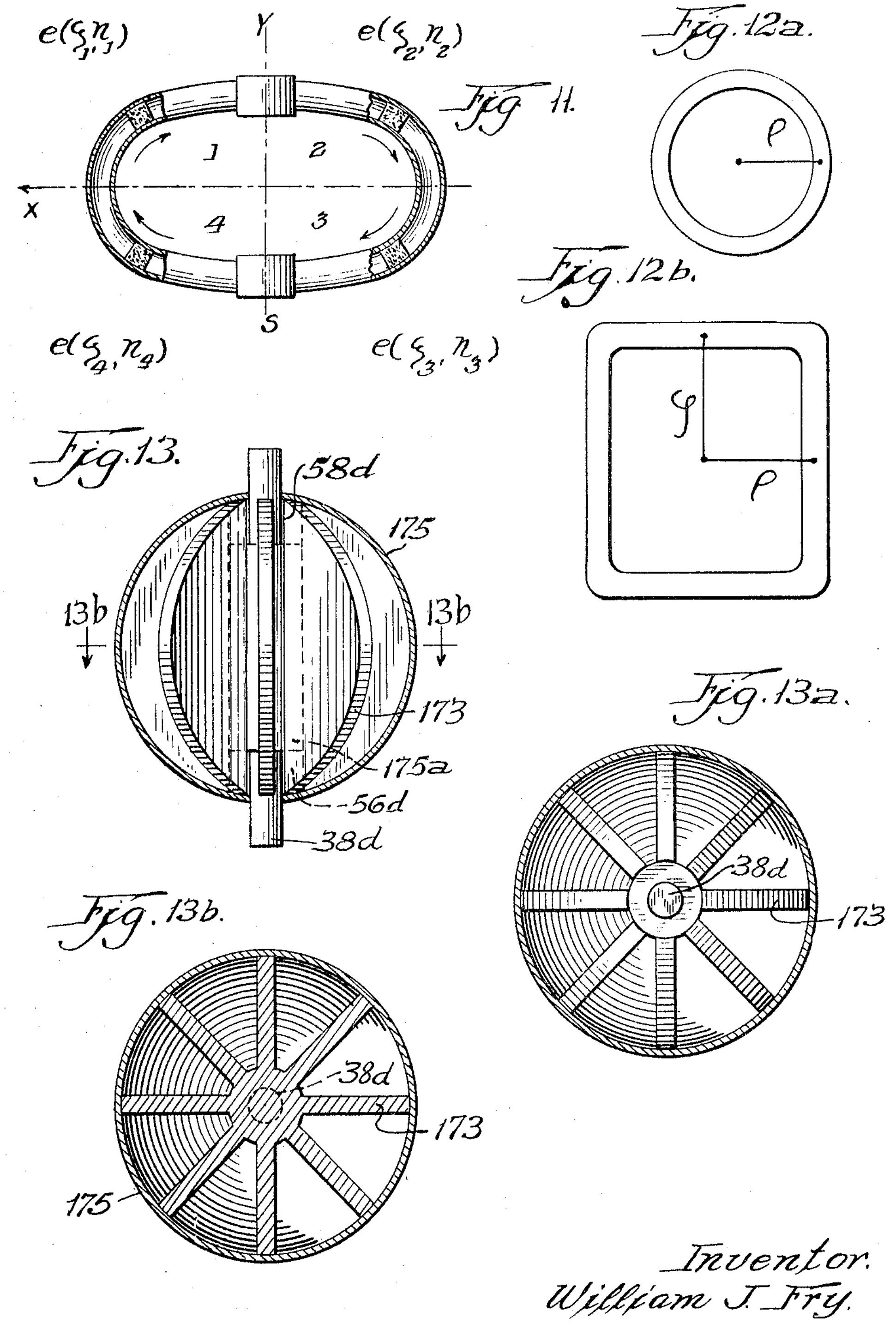
Figure 14:
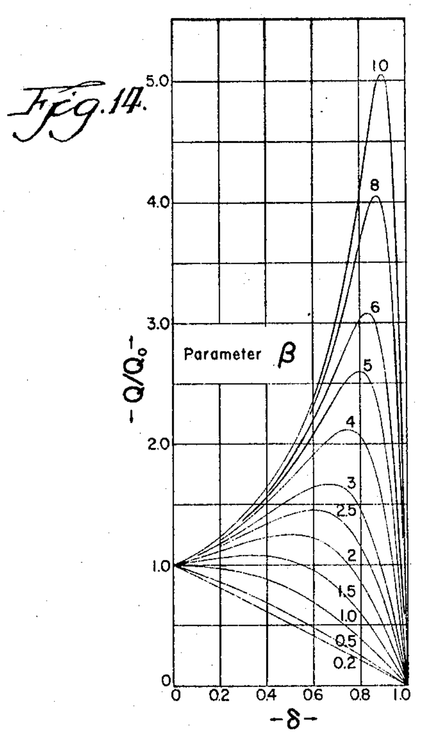
Figure 18:
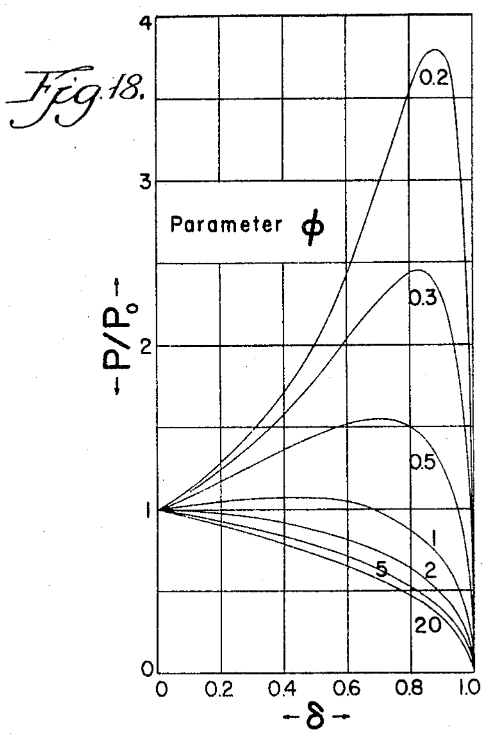
Figure 17:
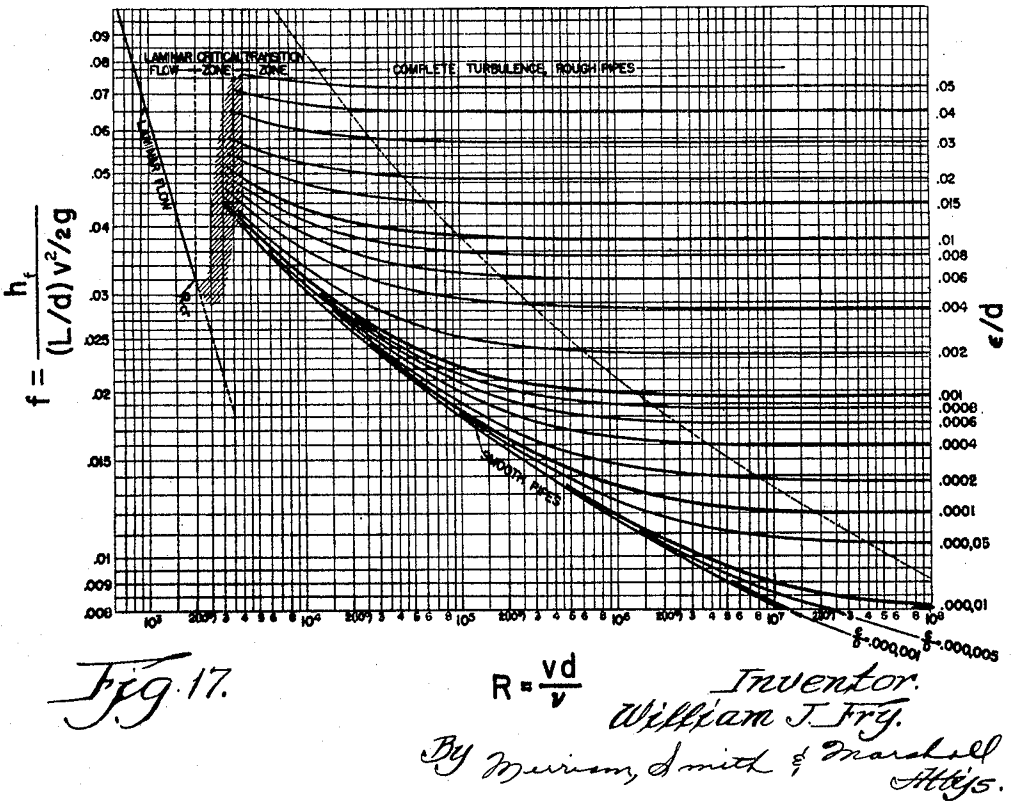
Figure 15:
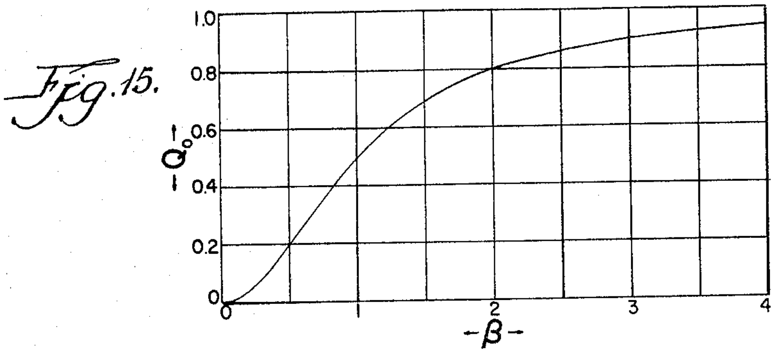
Figure 16:
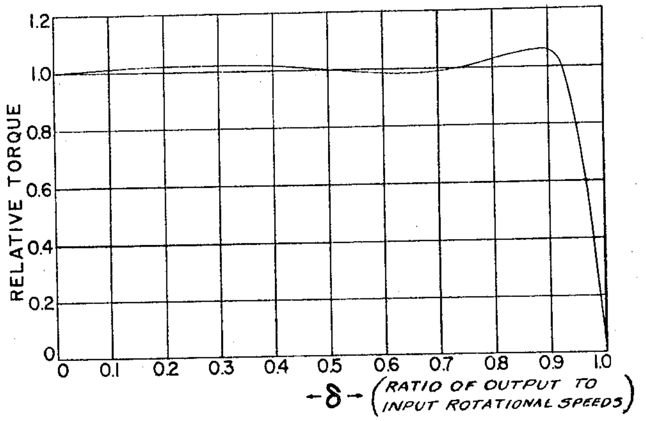
Figure 19:
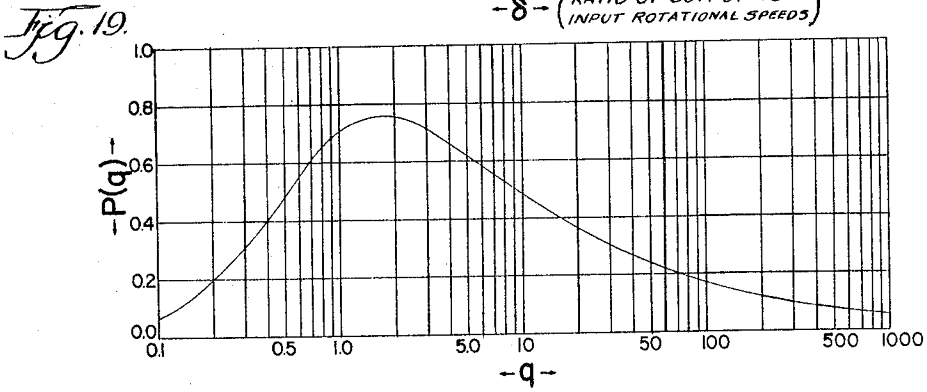
Figure 20:
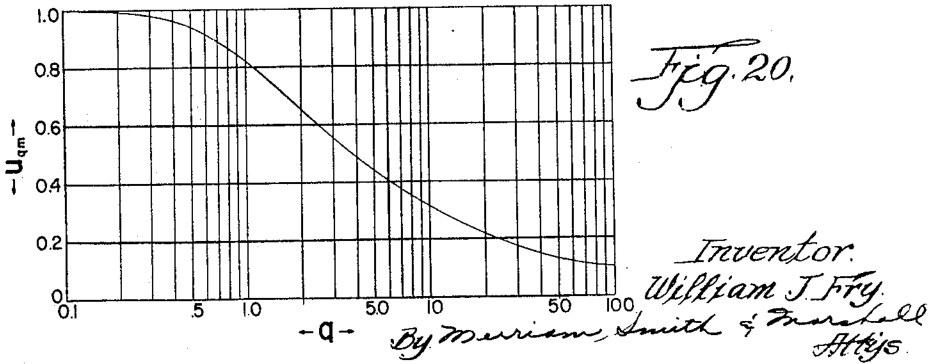
Figures 22, 23, 24, 25:
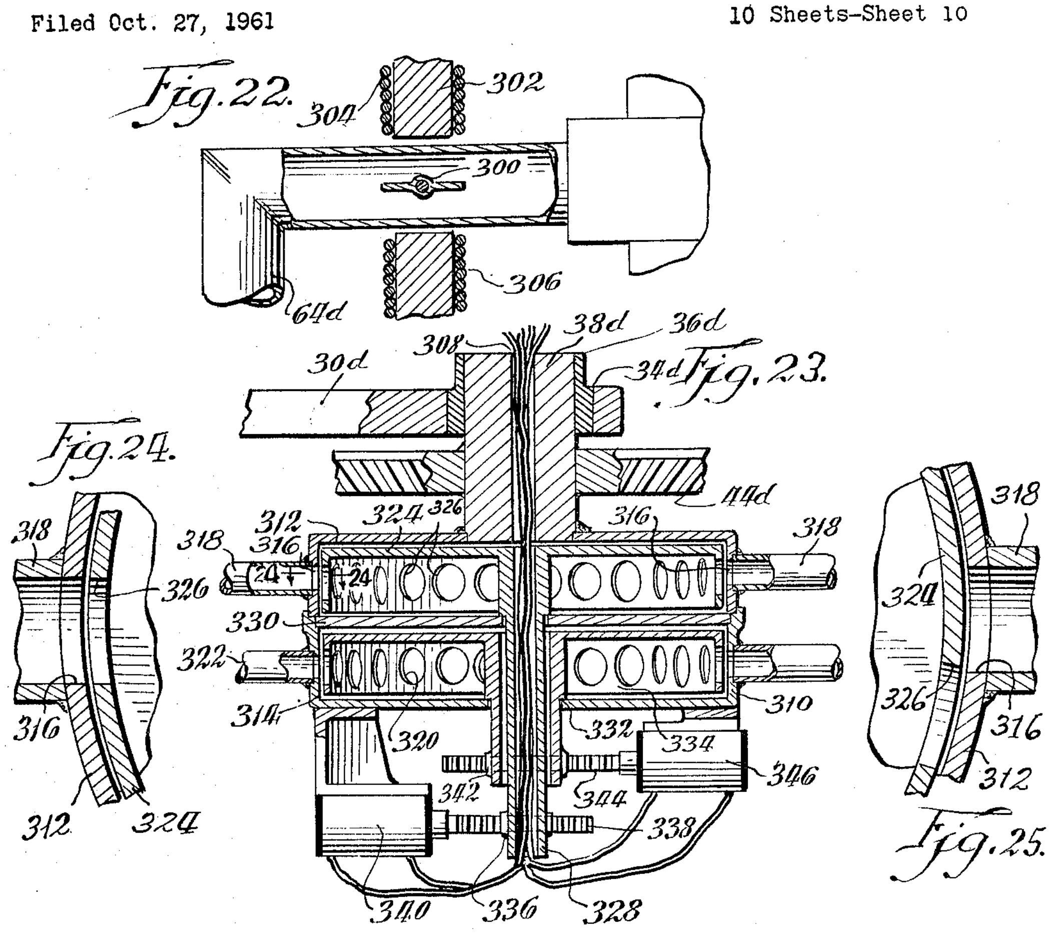
Figures 26, 27:
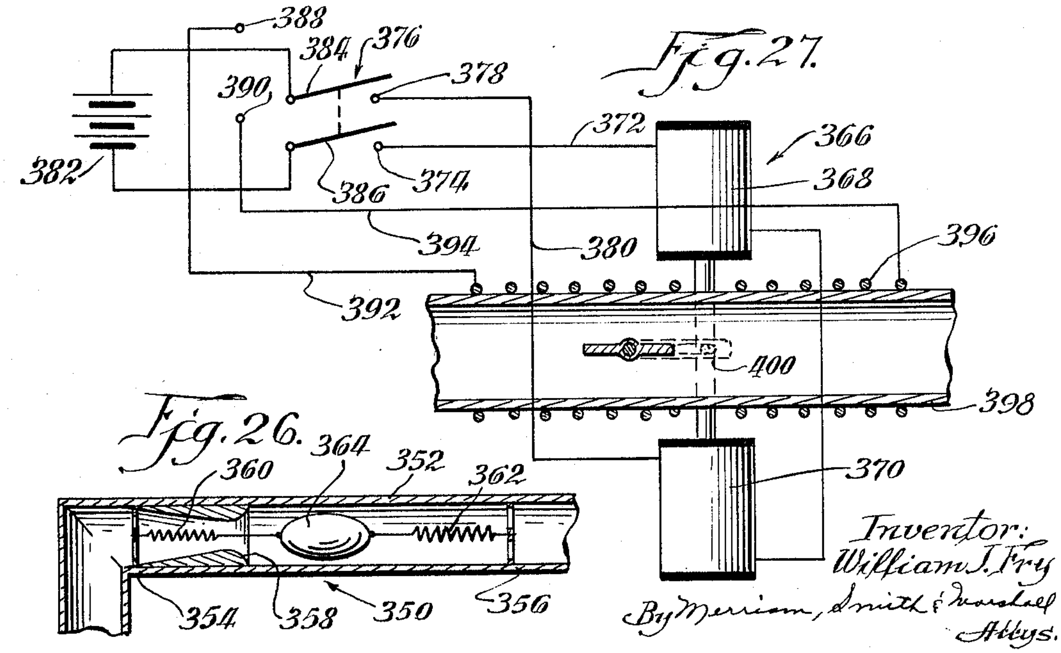

FIGURE 8*a* is a schematic illustration, partly in section, of the fluid system of the present coupling illustrating the fluid flow and showing a coordinate system based upon the plane of a tube axis;

FIGURE 8*b* is a diagrammatic view of a moving coordinate system used in the analysis and showing the rotational angle $\theta$;

FIGURE 8*c* is a diagrammatic illustration of a coordinate system showing the relationship of fixed axes to moving coordinates and illustrating the rotational angle $\phi$;

FIGURE 9 is a diagrammatic view illustrating another form of the present invention;

FIGURE 9*a* is a schematic view illustrating a magnetic and electric means for controlling the phase of the oscillating component of flow of the transfer medium;

FIGURE 10 is a schematic representation of another modified form of the present invention in which novel means are provided for heat dissipation;

FIGURE 11 is a diagrammatic representation of a single path of a system showing four symmetrically positioned equal parcels of the fluid;

FIGURES 12*a* and 12*b* show coordinates used to describe circular and rectangular tube configurations;

FIGURE 13 shows a modified form of coupling of the present invention;

FIGURE 13*a* is a top plan view of the coupling of FIGURE 13;

FIGURE 13*b* is a sectional view taken substantially on line 13*b*—13*b* of FIGURE 13;

FIGURE 14 is a graph illustrating torque characteristics of different "single layer" couplings under laminar flow conditions as compared to the same couplings at stall, showing the normalized torque characteristic $Q/Q_0$ as a function of the ratio of the output to the input rotational speed; and for various values of the parameter $\beta$ whose value is dependent on parameters important in the fluid flow—the friction exerted by the supporting means and the fluid density—and dependent on the input rotation velocity;

FIGURE 15 is a graph illustrating the relationship between $Q_0$ and $\beta$;

FIGURE 16 is a graph illustrating the flat torque characteristic obtainable in a multi-layer coupling, and showing the relative torque as a function of the ratio of output to input rotational speed;

FIGURE 17 is a graph showing the relationship between the friction factor $f$, the Reynolds Number R and the tube roughness for steady flow of a liquid in circular tubes;

FIGURE 18 is a graph illustrating the normalized torque characteristics of different "single layer" couplings, under complete turbulent flow conditions, with all fluid paths characterized by the same value of the parameter $\phi$ in each case, the torque curves being normalized with respect to the torque of the same couplings at stall;

FIGURE 19 is a graph of the values of the parameter $P(q)$ important in describing turbulent flow operation as a function of the parameter $q$;

FIGURE 20 is a graph of the maximum value of the flow function $U_{qm}$ used in describing the turbulent flow case as a function of the parameter $q$;

FIGURE 21 is a diagrammatic plan view, partly in section, of the coupler of the present invention combined with a differential mechanism;

FIGURE 22 is a fragmentary elevational view of a modified form of the present invention in which means are provided for selectively obstructing the fluid paths;

FIGURE 23 is another modified form of the present invention;

FIGURE 24 is a fragmentary sectional view taken substantially on line 24—24 of FIGURE 23;

FIGURE 25 is a fragmentary sectional view showing the mechanism of FIGURE 22 in a position in which fluid flow is obstructed;

FIGURE 26 is a fragmentary sectional view, diagrammatic in nature, showing another modified form of the present invention in which means are provided for obstructing the fluid paths in response to rotor speed; and FIGURE 27 is a schematic section view showing a further modified form of the present invention in which novel means are provided for interrupting the flow of fluid in the paths.

Figures 1, 4:
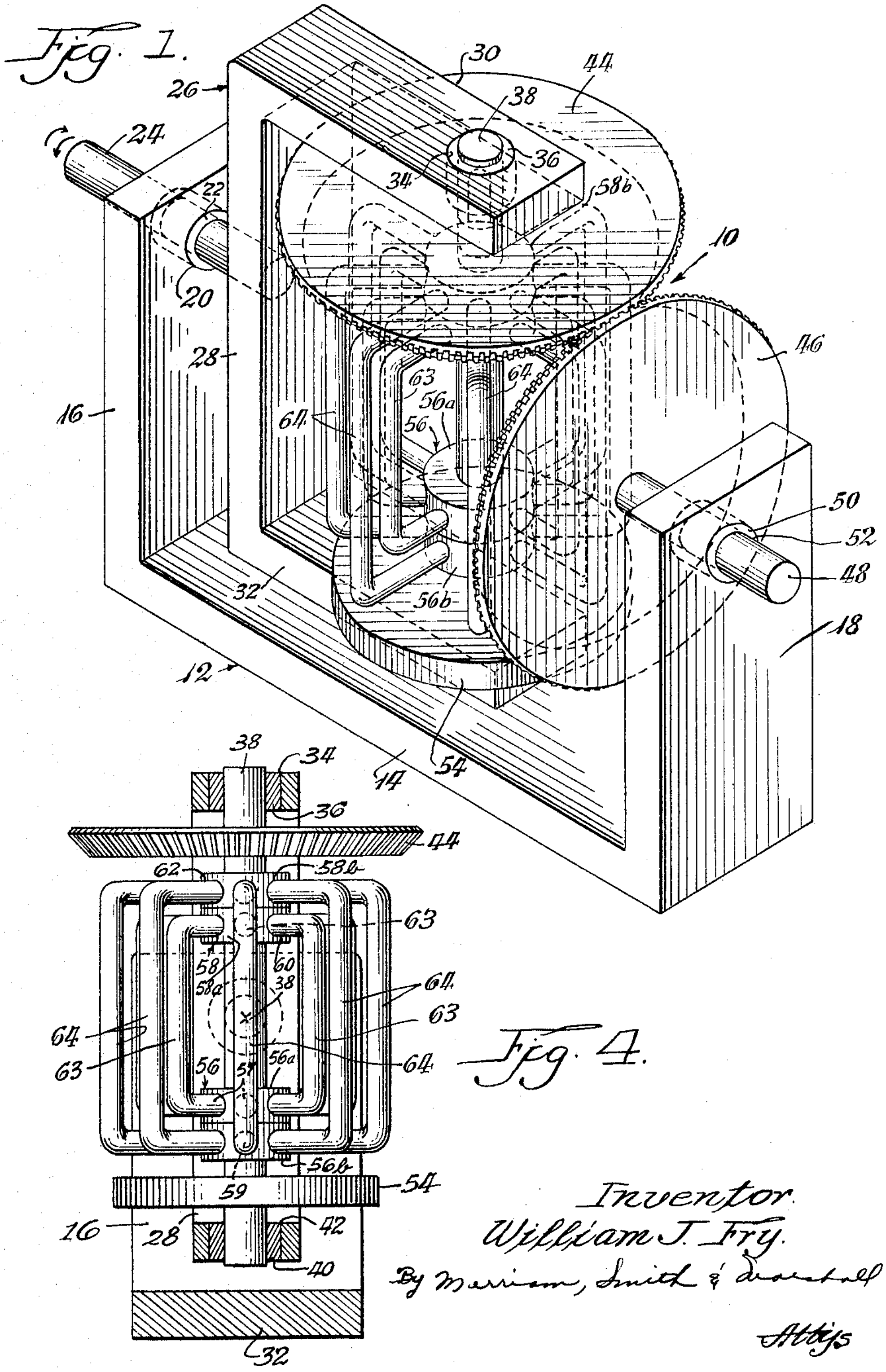
FIGURE 1 is an isometric view, schematic in nature, of a fluid coupling made in accordance with the present invention and shown in association with representative input and output members.
FIGURE 4 is an elevational sectional view taken substantially on line 4—4 of FIGURE 2.
Figure 2:
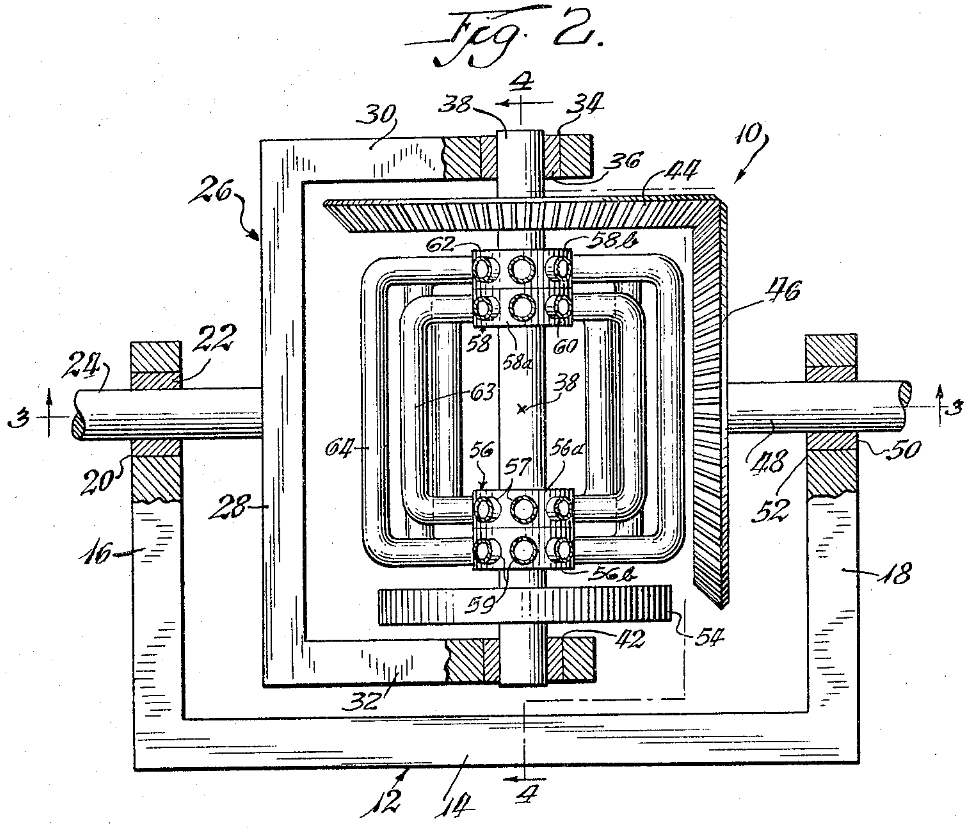
FIGURE 2 is a view partly in section as viewed from the left in FIGURE 1.

Referring now to the drawings and more particularly to FIGURES 1, 2, 3 and 4, there is schematically illustrated a power transmitting mechanism indicated generally by reference number 10 and including a support 12 having a base 14 and spaced perpendicular standards 16 and 18, substantially parallel each to the other. Formed in the standard 16 is an opening 20 for reception of a bearing 22 for journaling an input shaft 24 which is fixedly secured, in any suitable manner, to a yoke 26 having a base 28 and spaced parallel tines 30 and 32. Tine 30 has an opening 34 for reception of a bearing 36 in which is journaled a shaft 38, the other end of which is journaled in a bearing 40 received in an opening 42 in tine 32. Affixed to the shaft 38, at the upper end thereof, as viewed in FIGURES 1, 2 and 4, is a drive gear 44 illustrated as being in mesh with a driven gear 46 affixed to a shaft 48 which is journaled in a bearing 50 received in an opening 52 in the standard 18. At the lower end of the shaft 38, as viewed in FIGURES 1, 2 and 4, is a balance wheel 54. Upon rotation of the input shaft 24, the yoke 26 is rotated about the axis of the shaft 24 and the shaft 38 is also rotated end-for-end about the same axis. Assuming clockwise rotation of the shaft 24, as viewed from the left in FIGURE 2, and assuming a load on the output shaft 48, the drive gear 44 will rotate and initially advance upon the driven gear 46, thus rotating the shaft 38. According to the present invention, torque is applied to the shaft 38 as required, to overcome the reaction of the output shaft 48. In lieu of shaft 38 two separate stub shafts may be employed as will be understood.

Disposed on the shaft 38 at points equally spaced from the axis of rotation of the shaft 38 about the axis of the shaft 24 are fluid chambers 56 and 58. Chamber 56 is divided into annular sub-chambers 56*a* and 56*b*. The sub-chamber 56*a* is formed with a plurality of circumferentially spaced openings 57 while the sub-chamber 56*b* is formed with a plurality circumferentially spaced openings 59. Chamber 58 is divided into adjacent annular sub-chambers 58*a* and 58*b*. Sub-chamber 58*a* is formed with a series of circumferentially spaced openings 60 while sub-chamber 58*b* is formed with a plurality of circumferentially spaced openings 62. Extending between corresponding openings 57 in the sub-chamber 56*a* and openings 60 in the sub-chamber 58*a* are substantially U-shaped tubes 63 affording free fluid communication between the sub-chamber 56*a* and the sub-chamber 58*a*. Likewise, extending between each of the openings 59 and the corresponding openings 62 of the sub-chamber 58*b* is a substantially U-shaped tube 64, each of which has a base portion spaced radially from the shaft 38 a greater distance than the base portion of the tubes 63. As illustrated clearly in FIGURE 3, the base portion of the tube 64 are circumferentially spaced and describe a circle of greater diameter than that of the circumferentially spaced base portions of the tube 63. According to the present invention, rotation of the shaft 38 end-for-end about the axis of the shaft 24 produces oscillatory movement of fluid in an inner circuit comprising the sub-chambers 56*a* and 58*a* and the tubes 63 and an outer circuit including the sub-chambers 56*b*, 58*b* and the tubes 64. The velocity amplitude of the fluid in such a circuit is equal in each direction. According to the present invention, however, the fluid flow is modified by either retarding or accelarating forces in such a manner that the phase of the oscillating flow is adjusted to provide a non-zero average torque and power transfer. By this arrangement, the fluid movement produces a non-zero time average precessional force which provides torque to the shaft 38, upon rotation of the drive shaft 24, as required by the load on the output shaft 48. In other words, the torque due to precessional forces occasioned by the fluid movement within the several circuits is provided in proportion to the amount of resistance afforded by the shaft 48. It will be appreciated that the coupling of the present invention would be operative with either the inner fluid circuit alone or the outer fluid circuit alone.

Figure 5:
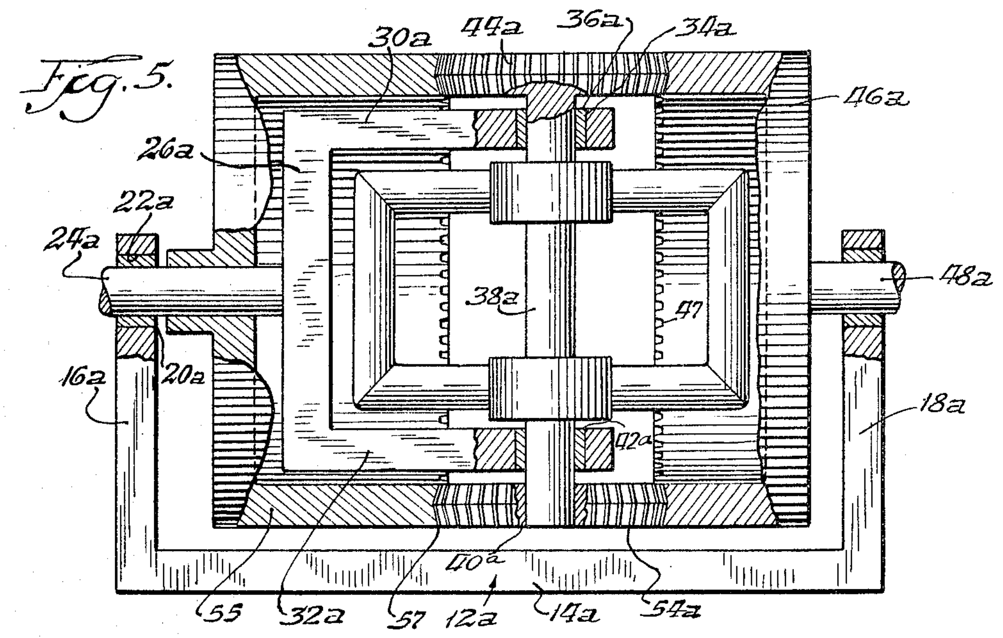
FIGURE 5 is an elevational view, partly in section, showing a modified form of the present invention.

In FIGURE 5 is shown a modified form of the present invention in which a support 12*a* has a base portion 14*a* and spaced perpendicular standards 16*a* and 18*a*. The standard 16*a* has an opening 20*a* for reception of a bearing 22*a* in which is journaled a shaft 24*a* the inner end of which is secured to a yoke 26*a* having tines 30*a* and 32*a*. Tine 30*a* has an opening 34*a* for reception of a bearing 36*a* in which is journaled a shaft 38*a*, the other end of which is journaled in a bearing 40*a* received in an opening 42*a* in tine 32*a*. Affixed to the shaft 38*a*, outwardly of the tine 30*a*, is a drive gear 44*a* illustrated as being in mesh with a driven gear 46*a* which is in the form of a cup having on the rim thereof recessed teeth 47. To balance the drive shaft 44*a*, an idler gear 54*a* substantially identical to the gear 44*a* is provided. Likewise, a balance gear 55 is rotatably mounted on the drive shaft 24*a* and is provided with a recessed rim gear 57 with which is meshed the gears 44*a* and 54*a*. The elements of the coupling are substantially identical to that of FIGURE 1 and are identified by the same reference numerals.

Figure 6:
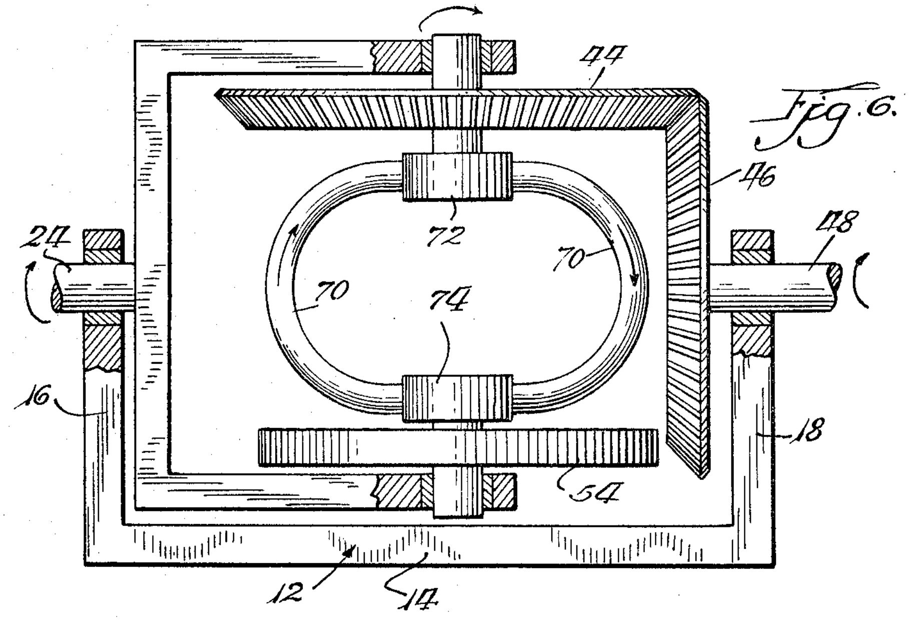
FIGURE 6 is a schematic illustration, similar to FIGURE 1, but simplified for the sake of clarity.
Figure 7:
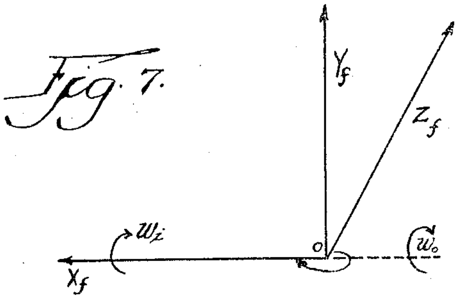
FIGURE 7 is a diagram illustrating the system of coordinate axes fixed in space and employed in the analytic description of the present coupling.

In FIGURE 6 is shown, for purposes of explanation of the theory of the present invention, a drive mechanism in which a single circuit is utilized and in which a pair of diametrically opposed tubes 70 connect spaced chambers 72 and 74. It will be appreciated that when the circuit is rotated end-for-end, the transfer medium, such as a fluid or the like, flows in oscillating fashion in the direction of the tube axis as indicated and the reverse. In FIGURE 7 is shown a right-handed coordinate system fixed in space and having an origin O considered to be at the center of the coupling of FIGURE 6. The positive direction of $X_f$ axis extends towards the input shaft while the coordinate axis $Y_f$ is any arbitrary direction perpendicular to the $X_f$ axis. The $Z_f$ axis perpendicular to both the $X_f$ and $Y_f$ completes this right-handed system. This coordinate system is convenient for computing the velocity and acceleration of fluid within the tube of FIGURE 6, under various input speed conditions.

Figure 3:
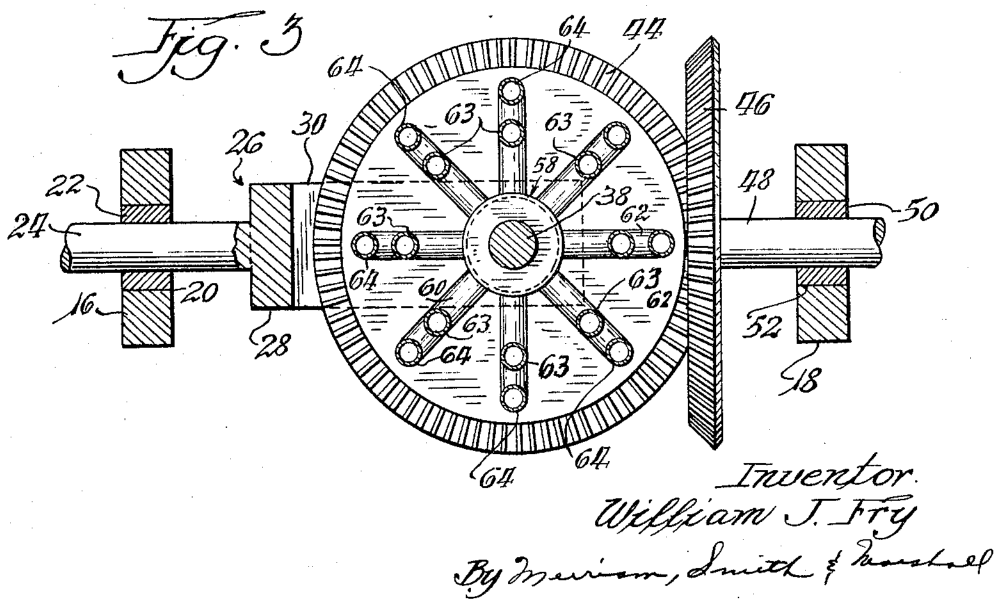
FIGURE 3 is a sectional plan view taken substantially on line 3—3 of FIGURE 2.

For a mathematical analysis of this phenomenon, it is desirable to introduce in addition to the fixed coordinate system a moving coordinate system with the Y axis along the axis of the shaft 38 and the X axis in the plane of a tube as illustrated and to define certain conventions. FIGURES 6 and 7 show the convention adopted for positive rotation, as indicated by the arrows. The convention is used to define direction of positive rotation when the axis of the shaft 38 assumes a position which is colinear with the fixed axis $Y_f$ and when the axis of the driving gear 44 intersects the axis $Y_f$, when viewed from the point O. It will be appreciated that, assuming these conditions, the positive direction of rotation is defined as being the direction of $Z_f$ rotating into $X_f$, through the larger angle as shown in FIGURE 7. It should be assumed, also, that the positive direction of fluid flow in the tubes of FIGURE 3 is in the direction of the arrows in FIGURE 8*a* that is the direction determined by moving from the symbol Q, one intersection of the tube with the X axis is arbitrarily labeled with the symbol, in the direction of the gear 44 (not shown in FIGURE 8*a*). The speed of flow of the fluid along the tube is designated by the symbol V.

In making the analysis, it is convenient to introduce a third coordinate Z, perpendicular to $X_f$ and to Y, with its direction so chosen that the system $X_f$, Y and Z is right-handed. So arranged, the moving coordinates of the system (one coordinate axis, $X_f$, being fixed in space) are illustrated in FIGURE 8*b*. In this figure, the angle $\theta$ between the axis $X_f$ and X is measured from the positive direction of $X_f$ and is positive when measured in the positive direction of rotation of the shaft 38. The plane of $X_f$ and Y represents the plane of the yoke 26. The angle that this plane makes with the fixed plane determined by the coordinate axes $X_f$ and $Y_f$ is designated $\phi$, as shown in FIGURE 8*c*. The angle $\phi$ is measured from the positive direction of $Y_f$ and is positive in the direction of positive rotation of the input and output shafts.

In the case of laminar flow the steady state velocity, which may be designated by $w$ for a tube of circular cross section, in response to a time independent pressure gradient is a function of the radial coordinate $a$, measured from the tube center, so that the following relationship obtains:

$$w=2W\left(\frac{1-a^2}{a^2_0}\right)$$

where $a_0$ designates the radius of the tube and W is the mean velocity of flow. In the case where turbulence obtains in the tubes the longitudinal velocity over the tube cross section is more uniform than in the case of laminar flow. The decrease of the velocity to zero at the boundary surface occurs in a thin region adjacent to the boundary in this case. For the purpose of this analysis, it will be assumed that the flow of liquid is described by the mean velocity depending only upon time and the analysis is based on the movement of disc-shaped increments of liquid flowing along the tube axis at a mean velocity.

The basic formulas for describing the operation of the coupler, refer to FIGURES 6, 7, 8*a*, 8*b* and 8*c* are:

$$T_0 = T_1 \qquad (1)$$

$$T_0 = (g_0/g_s)\frac{2\omega_i}{\pi}\sum_k n_k J_{tk}\int_{\theta_0}^{\theta_0+\pi} v_k(\theta)\cos\theta\, d\theta \qquad (2)$$

$$\omega_s = (g_0/g_s)\omega_1 - \omega_0 \qquad (3)$$

where for laminar flow $$v_k = \left[\frac{(rL_t/m_t)(2J_t/m_t)}{\omega_s^2 + (rL_t/m_t)^2}\right]_k \omega_s\omega_i \cos\theta + \left[\frac{2J_t/m_t}{\omega_s^2 + (rL_t/m_t)^2}\right]_k \omega_s^2\omega_i \sin\theta \qquad (4)$$

and for complete turbulent flow $$v_k = H_k[u_q(\theta)]_k \qquad (5)$$

The subscript *k* attached to the symbols refers to the *k*-th layer of tubes, the summation is over all layers of tubes and the definite integral of $u_q \cos\theta$ is graphed (FIG. 19) for a wide range of values of *q*.

In the foregoing formulas:

$T_0$ represents the torque exerted by the output shaft 48 on the load;
$T_1$ represents the torque exerted on the input shaft 24 by the driver;
$g_0$ represents the radius of the gear 46;
$g_s$ represents the radius of the gear 44;
$\omega_1$ represents the angular velocity of rotation of the input shaft 24;
$\eta$ represents the *y* coordinate of element *e* of the medium;
$J_t$, $I_t$ represent parameters which depend upon the tube shape and the mass of transfer medium per unit length;
$v_k$ represents the speed of fluid flow along the tube axis;
$\omega_s$ represents the angular velocity of rotation of the spin-shaft 38;
$\omega_0$ represents the angular velocity of rotation of the output shaft 48;
*r* represents the retarding or frictional force constant for laminar flow;
$L_t$ represents the length of the tube;
$m_t$ represents the total mass of the medium, such as liquid, in a single tube;
$n_k$ represents the number of tubes in the *k*-th layer;
$H_k$ represents a parameter which depends upon the mass of transfer medium in a tube, upon the shape of the tube and upon the angular velocity of the input shaft;
$u_q(\theta)$ represents the steady state solution of $$du/d\theta \pm qu^2 = \cos\theta$$

where the + sign is used if $u > o$ and the − sign is used if $u < 0$.

When the input shaft 24 is at rest, i.e., $\omega_1 = 0$ power may not be transmited through the device of the present invention through the output shaft 48. If, however, $\omega_1$ is not zero, then torque can be transferred from the output shaft 48 to the input shaft 24 in a manner that will be hereafter apparent.

The unilateral property of the coupler with one shaft not rotating is readily deduced from the relations (1) to (3) and from the differential equation from which the flow function $v_k$ is obtained. Consider first the dynamical equilibrium state in which $\omega_1 = 0$. It follows from (4)

(for laminar flow) and from (5) (for complete turbulent flow) that $v_k = 0$ for all values of *k*. Thus from Equation 2 $T_0 = 0$, which implies from Equation 1 that $T_1 = 0$ for all values of $\omega_0$. However, if $\omega_0 = 0$ and $\omega_1$ is not zero then it follows from the expressions (1) to (5) that $T_1$ and $T_0$ are not zero.

If $\omega_1$ is greater than zero, then braking is possible, i.e., energy can be transferred from output to input as shown by the following argument. The rate of energy ($\omega_1 T_0$) transfer from output to input shaft can be maximized as follows. The expression for this energy transfer rate takes the following form for the laminar flow case:

$$\omega_i T_0 = -K\frac{\omega_i^3(\omega_0 - \omega_i)}{a(\omega_0 - \omega_i)^2 + b}$$

where K, *a* and *b* are parameters independent of the angular velocities. This is a maximum for some value of $\omega_1$. Note that if $\omega_1$ is cancelled from both sides of the formula that the resulting expression for $T_0$ is zero when $\omega_1 = 0$. To find the maximum value, differentiate with respect to $\omega_1$ and set the resulting expression equal to zero and solve for $\omega_1$.

The expression is:

$$3a(\omega_0 - \omega_1)^3 + 3b(\omega_0 - \omega_1) + a\omega_1(\omega_0 - \omega_1)^2 - \omega_1 b = 0$$

As will be shown by the specific examples, laminar flow operation obtains over much of the range of immediate practical interest for gyro-fluid couplers, and specific tube configurations will be considered on the basis of the relations applicable to this case. The operating characteristics of couplers with similar tube configurations will also be briefly considered for turbulent flow conditions. A comparison of performances under the two flow conditions will thus be accomplished.

The specific tube configuration selected depends, of course, upon the choice of certain criteria. For example, suppose a design of a single layer rotor is desired such that maximum torque is transmitted given fixed values for: input angular velocity, tube cross section, viscosity and density of the liquid, gear ratio, number of tubes and either the total mass of liquid per tube or the total length of a tube. Then, if the tubes are relatively widely spaced from one another at the equator of the rotor, so that the length of the overlap region of the tubes as they approach the spin axis at the poles of the rotor is small, the optimum tube configuration will be that corresponding to a maximum value of the quantity $J_t$. This is immediately evident from Equations 2 and 4 since this quantity is the only one in the expressions which depends on the tube configuration and it is assumed that the tube spacing is such that geometrical overlapping of the tubes is not involved except over a small fraction of the tube length.

Since $J_t$ is equal to the product of the area (in the plane of the tube) enclosed by the tube axis and the mass of liquid per unit length of the tube, the problem of maximizing $J_t$ reduces, under the stated conditions, to choosing a tube configuration to bound maximum area. The tube configuration satisfying this condition is a circle. Now, as the tube spacing at the equator of the rotor is decreased, the overlap region increases in length, and it is no longer possible to consider the problem of the transmission of maximum torque in a simplified fashion. Under such conditions, the "optimum" design depends upon the consideration of a multitude of specific design details. Since this disclosure is primarily to describe quantitatively the general principles of operation of these devices, detailed design questions associated with problems of close packing will not be considered. For the purpose of illustrating the method of approximating a variety of torque characteristics and to indicate the dependence of rotor size on the torque and power handling capacity of the device, it is convenient to consider two different tube configurations; the circular and the rectangular, as illustrated by parts (*a*) and (*b*) of FIGURE 12.

Multilayer rotors may, of course, be constructed and can consist of a number of layers of individual tubes. Multilayer designs are extremely useful in tailoring a design to approximate any desired transient torque characteristic. For many applications it is possible to design the rotor so that it consists of a series of ducts, angularly spaced, about the spin axis as shown by FIG. 13, instead of a multilayer tube arrangement. If a duct arrangement is satisfactory from the viewpoint of coupler performance it may be the design of choice, since for many operations it is more economical to construct than a multilayer tube type rotor.

It was above indicated that two tube configurations are herein considered; the circular and the rectangular (FIG. 12). For the circular configuration $J_t=\pi\sigma\rho^2$ and $2J_t/m_t=\rho$ where $\sigma$ represents the mass of the transfer medium, such as the liquid, per unit length of tube; and $\rho$ represents the diameter of the tube at the equator, that is the center of the rotor to the tube axis. For the rectangular configuration $J_t=4\sigma\rho\zeta$ and $$2J_t/m_t=\frac{2\rho\zeta}{\rho+\zeta}$$

$\zeta$ represents the tube dimension along the spin axis, that is, center of the rotor to axis of the tube at the pole. In general $rL_t/m_t=r/\sigma$. The subscript $k$ is omitted from the symbols since these expressions refer to a single layer of tubes. From these results and from Equations 2 and 4 the torque transmitted by a single layer rotor is (torques transmitted by multilayer rotors are obtained by the summation procedure as indicated by Equation 2)

$$T_0=\pi n r\rho^3\frac{(g_0/g_s)^2\omega_i^2(\omega_i-\omega_0)}{(g_0/g_s)^2(\omega_i-\omega_0)^2+(r/\sigma)^2} \quad (6)$$

for the circular configuration, and $$T_0=8nr\left(\frac{\rho^2\zeta^2}{\rho+\zeta}\right)\frac{(g_0/g_s)^2\omega_i^2(\omega_i-\omega_0)}{(g_0/g_s)^2(\omega_i-\omega_0)^2+(r/\sigma)^2} \quad (7)$$

for the rectangular configuration, where $\omega_s$ has been expressed in terms of $\omega_i$ and $\omega_0$ from Equation 3.

Let $$\delta=\omega_0/\omega_i \quad (8)$$

and $$\beta=\frac{\left(\frac{g_0}{g_s}\right)\omega_i}{r/\sigma} \quad (9)$$

Then Equations 6 and 7 can be expressed as $$T_0=\pi n r\rho^3\omega_i\left[\frac{\beta^2(1-\delta)}{\beta^2(1-\delta)^2+1}\right] \quad (10)$$

(For circular configuration)

and $$T_0=8nr\left(\frac{\rho^2\zeta^2}{\rho+\zeta}\right)\omega_i\left[\frac{\beta^2(1-\delta)}{\beta^2(1-\delta)^2+1}\right] \quad (11)$$

(For rectangular configuration).

where $n$ represents the number of tubes in a layer of tubes of the rotor. The bracketed expression is independent of the size of the coupler (however the tube size is involved through the quantity $\sigma$) but it does determine the ratio between operating and stall (output shaft held fixed) torques. The coefficients of the bracketed expressions are markedly dependent on the size of the coupler. These coefficients do not however affect the ratio between operating and stall torques. Therefore it is convenient for design chart purposes to let $$M_c=\pi n r\rho^3\omega_i \quad (12)$$

$$M_r=8nr\left(\frac{\rho^2\zeta^2}{\rho+\zeta}\right)\omega_i \quad (13)$$

$$Q=\frac{\beta^2(1-\delta)}{\beta^2(1-\delta)^2+1} \quad (14)$$

and $$Q_0=\frac{\beta^2}{\beta^2+1} \quad (15)$$

where $M_c$ represents a parameter which depends upon input rotational speed, frictional (retarding) force constant and tube dimensions, $M_r$ represents a parameter which depends upon input rotational speed, frictional (retarding) force constant and tube dimensions, Q represents a parameter which depends upon input and output rotational speed, frictional force constant and mass of transfer medium per unit length of tube, $\beta$ represents a parameter which depends upon input rotational speed, frictional force constant and mass of transfer medium per unit length of tube.

Then $$T_0=M_cQ_0(Q/Q_0) \quad (16)$$

for the circular configuration and $$T_0=M_rQ_0(Q/Q_0) \quad (17)$$

for the rectangular configuration. Symbol $Q_0$ represents a parameter which depends upon input rotational speed, frictional force constant and mass of transfer medium per unit length of tube. The quantity $Q/Q_0$ is graphed in FIGURE 14 as a function of the variable $\delta$ and the parameter $\beta$. It can be seen from the fundamental equations, that in general at $\delta=1$ the output angular velocity is equal to the input angular velocity and no torque can be transferred. This result follows immediately from Equations 6 and 7 for the configurations under discussion. It is advantageous to operate at a value of $\delta$ close to 1.0 since the efficiency approaches unity as $\delta$ approaches one. This follows since the power input is equal to $\omega_iT_i$, the power output is equal to $\omega_0T_0$ and the efficiency is then $$\frac{\omega_0T_0}{\omega_iT_i}=\delta \quad (18)$$

As can be seen from the graphs of FIGURE 14, it is possible to design single layer couplers with operating torques (for example, the torque at $\delta=0.9$ at which the efficiency is 90%) either greater than, equal to or less than the stall torque (the torque with the output shaft held fixed, $\delta=0$) by proper choice of a value for $\beta$. Much greater versatility is possible in multilayer rotors. A wide variety of torque characteristics can be provided by couplers having such rotors as will later be shown.

Although the graphs of FIGURE 14 are strictly applicable only under dynamical equilibrium conditions it is possible to obtain from them an approximate idea of the transient behaviour of the coupler if the output angular velocity changes slowly. That is, if the angular velocity of the output shaft changes by only a small fraction of its value, while the input shaft makes a complete revolution the graphs of FIGURE 14 will be recognized as showing how he transmitted torque varies with the angular velocity of the output shaft as the transient buildup to steady operation is achieved.

FIGURE 15 shows the quantity $Q_0$ graphed as a function of $\beta$.

A relation between the size of a rotor and its power handling capacity is now obtained. Consider two rotors with tubes of the same configuration and surface roughness and containing the same liquid. If the tube cross sections in each case are of the same shape and size and if the angular velocities are equal, a single layer of tubes in each rotor may be considered where $\rho_0$ designates the equatorial radius of a specific layer of tubes of the smaller rotor. Then, if the linear scaling factor between the two rotors is designated by B the equatorial diameter $\rho$, of the corresponding layer of tubes in the larger rotor is given by $\rho=B\rho_0$. Similarly it will be found that the tube dimension along the spin axis is represente d as $\zeta = B\zeta_0$. If the circumferential spacing of the tubes in the corresponding layers is the same in each case, and if the subscript zero on $n$ designates the number of tubes in the specific layer of the smaller rotor, then $n = n_0\rho/\rho_0$ where $n$ (the $n$ of expressions (10) and (11) is the number of tubes in the corresponding layer of the larger rotor. It also follows, from the fact that the cross-sectional areas of the tubes of corresponding layers of the different rotors are the same in each case, that the larger rotor can contain B times as many layers of tubes as the smaller rotor. By substituting into Equations 10 and 11 the expressions $\rho = B\rho_0$, $\zeta = B\zeta_0$ and $n = Bn_0$ it is clear that the torque transferred per layer of tubes for the larger rotor is $B^4$ times that transferred for the corresponding layer of tubes of the smaller rotor. Then, since the ratio of the number of tube layers in the larger rotor to the number of layers in the smaller rotor is B, the ratio of torque (and power) handling capacity is $B^5$. The power transmission capacity for rotors similar in the respects described, is therefore, proportional to the fifth power of a linear dimension.

As above indicated the design graphs and formulas given here apply only if the flow velocity does not exceed the laminar flow range. The upper limit can be stated in terms of an approximate maximum permissible value for the Reynolds number (see, for example, the article entitled "Friction Factors for Pipe Flow" by L. F. Moody, Trans. Amer. Soc. of Mech. Eng. (1944) vol. 66, pages 671–678)

$$R = \frac{Vd}{\nu} \leq 2000$$

where V is the mean velocity of flow in centimeters per second, $\nu$ is the coefficient of kinematic viscosity in centimeters squared per second and $d$ is the diameter of the tube cross section in centimeters. This imposes an upper limit on the maximum value of the velocity for the laminar flow case. From Equation 4 above the maximum value of the flow velocity is $$\rho\omega_i = \frac{\beta(1-\delta)}{\beta^2(1-\delta)^2+1} \qquad (19)$$

for the circular configuration and $$\frac{2\rho\zeta}{\rho+\zeta}\omega_i\frac{\beta(1-\delta)}{\beta^2(1-\delta)^2+1} \qquad (20)$$

for the rectangular configuration. Therefore, for laminar flow, the following inequalities must be satisfied $$R = \frac{d\omega_i\rho\beta(1-\delta)}{v\sqrt{\beta^2(1-\delta)^2+1}} \leq 2000 \qquad (21)$$

for the circular configuration and $$R = \frac{d\omega_i}{v}\,\frac{2\rho\zeta}{\rho+\zeta}\,\frac{\beta(1-\delta)}{\sqrt{\beta^2(1-\delta)^2+1}} \leq 2000 \qquad (22)$$

for the rectangular configuration, each where R is the Reynolds number and $d$ is the diameter of the tube cross-section.

The retarding or frictional force constant for laminar, $r$, can be expressed in terms of the viscosity. For a tube of circular cross-section an explicit relation is calculated from Poiseuelle's law. If the law is expressed in terms of the mean velocity of flow, identical with the velocity function $v$, and the pressure gradient is written in terms of the frictional resistance per unit length of tube, $rv$, the following result is obtained:

$$r = 8\pi\mu$$

where $\mu$ is the coefficient of viscosity of the liquid.

The sizes of gyro-couplers required for the transfer of given torques or powers are now indicated and the method of approximating a desired torque characteristic is illustrated.

First consider couplers with single and multilayer rotors, all tubes of which are characterized by the same value of $\beta$. Then the torque characteristic of such a coupler will correspond to one of the curves of the family of FIGURE 14. The operating torque can be less than, greater than, or equal to the stall torque. However, once the operating efficiency and the ratio of operating to stall torque are chosen, the shape of the torque characteristic is determined. A number of specific examples are given in Table I immediately following.

TABLE I

*Rectangular tube configurations*

| Coupler Characteristics | Symbols | No. 4 | No. 1 | No. 10 |
|---|---|---|---|---|
| Torque Characteristic (Fig. 6) | $\beta$ | $\beta=4$ | $\beta=1$ | $\beta=10$ |
| | $Q_0$ | 0.94 | 0.50 | 0.99 |
| Output/Input Speed (operating) | $\delta_{0p}$ | 0.95 | 0.90 | 0.95 |
| Efficiency | | 95% | 90% | 95% |
| Operating/Stall Torque | $Q/Q_0$ | 0.80 | 0.20 | 4.0 |
| Liquid Viscosity (poises) | $\mu$ | 2.0 | 8.0 | 0.8 |
| | r | 50 | 200 | 20 |
| Input Speed (r.p.m.) | | 1,800 | 1,800 | 1,800 |
| | $\omega_i$ | 190 | 190 | 190 |
| Gear Ratio | $g_0/g_s$ | 4.0 | 4.0 | 4.0 |
| Mass of Liquid Per Unit Length of Tube (g./cm.). | $\sigma$ | 0.26 | 0.26 | 0.26 |
| Liquid Density (g./cm.$^3$) | | 1.0 | 1.0 | 1.0 |
| Tube Diam. (cm.) | d | 0.58 | 0.58 | 0.58 |

| Coupler Characteristics | Symbols | No. 4′ | No. 4″ | No. 1′ | No. 1″ | No. 10′ | No. 10″ |
|---|---|---|---|---|---|---|---|
| No. of layers of tubes | | 2 | 10 | 2 | 10 | 2 | 10. |
| Dimensions (cm.) (inner layer) | $\rho$ | 1.9 | 19 | 1.9 | 19 | 1.9 | 19. |
| | $\zeta$ | 1.9, 2.5 | 19, 25 | 1.9, 2.5 | 19, 25 | 1.9, 2.5 | 19, 25. |
| No. of tubes (inner layer) | $n_i$ | 9 (4 at $\zeta=1.9$) (5 at $\zeta=2.5$) | 90 | 9 (4 at $\zeta=1.9$) (5 at $\zeta=2.5$) | 90 | 9 (4 at $\zeta=1.9$) (5 at $\zeta=2.5$) | 90. |
| Dimensions (cm.) (outer layer) | $\rho$ | 2.5 | 25 | 2.5 | 25 | 2.5 | 25. |
| | $\zeta$ | 2.5, 3.1 | 25, 31 | 2.5, 3.1 | 25, 31 | 2.5, 3.1 | 25, 31. |
| No. of tubes (outer layer) | $n_o$ | 12 (6 at $\zeta=2.5$) (6 at $\zeta=3.1$) | 120 | 12 (6 at $\zeta=2.5$) (6 at $\zeta=3.1$) | 120 | 12 (6 at $\zeta=2.5$) (6 at $\zeta=3.1$) | 120. |
| Equatorial Radius of Rotor (cm.) | | 3 | 30 | 3 | 30 | 3 | 30. |
| | $\Sigma M_r$ | $1.4(10)^7$ | $\sim 0.57(10)^{12}$ | $4.58(10)^7$ | $\sim 2.3(10)^{12}$ | $0.458(10)^7$ | $\sim 0.23(10)^{12}$. |
| Operating Power Output (watts) | | 159 | $\sim 0.80(10)^7$ | 77 | $\sim 0.39(10)^7$ | 328 | $\sim 1.6(10)^7$. |
| Power Transfer at 0.9 Operating Speed (watts). | | 320 | $\sim 1.6(10)^7$ | 129 | $\sim 0.65(10)^7$ | 350 | $\sim 1.8(10)^7$. |
| Max. Reynolds No. (operating) | | 30 | 300 | 3.8 | 38 | 171 | 1,710. |

Note may also be made that a coupler with a torque characteristic of the form of the curve labeled 4 in FIGURE 14 (No. 4 of Table I) operating at 95% efficiency and at an input speed of 1800 r.p.m. can transmit 150 watts if the equatorial radius of the rotor is 3 centimeters and the other design characteristics are those given in the table. The table indicates that all of the tubes of one layer have the same value of $\rho$, but two values of $\zeta$ are listed. Some of the tubes of the layer correspond to one value of $\zeta$ and the remaining tubes correspond to the second value of $\zeta$. This is done to reduce the length of overlapping of the tubes. If the device is scaled-up in linear dimensions by a factor of ten (equatorial radius 30 cm.), the larger model can transmit approximately $1.5(10)^7$ watts assuming that heat dissipation does not limit the power transmission and that the device can be designed to withstand the stresses. The smaller rotor has two layers of tubes and the larger rotor contains ten layers of tubes of the same diameter as the tubes of the smaller model. An oil with a viscosity of 200 centipoises is an appropriate choice of liquid.

If a torque characteristic of the form of the curve labeled 1.0 in FIGURE 14 (No. 1 of Table I) is desired then the same size tubing as that used in the previous examples would be appropriate if a liquid having a viscosity of 800 centipoises is used. If such a rotor is operated with an output speed 0.90 of the input speed (1800 r.p.m.), then approximately 90 watts can be transmitted by a coupler with a rotor of 3 centimeters radius. This coupler has, under the specified operating conditions, about 60% of the power handling capacity of the coupler of the same physical size with the torque characteristic labeled 4. A coupler with a torque characteristic of the form of the curve labeled 10 in FIGURE 14 (No. 10 of Table I) is an improbable choice for a practical application. However, this type of characteristic for an appropriately chosen number of layers of tubes combined with a characteristic of the form of the immediately preceding example ($\beta=1$) for a suitably chosen number of layers of tubes can result in couplers with extremely useful torque characteristics as is evident from the next example.

A flat torque characteristic can be realized, for example, by designing a rotor with an inner layer of tubes having the torque characteristic designated by $\beta=1$ in FIGURE 14 and an outer layer having the torque characteristic corresponding to $\beta=10$. The torque characteristic of one such rotor is illustrated in FIGURE 16. With a constant input angular velocity of 1800 r.p.m. this rotor would produce essentially constant angular acceleration (assuming that quasi-equilibrium conditions obtain) in a suitable load over the entire range of output angular velocities from zero to about 93% of the input angular velocity. If the operating torque to drive the load is, at dynamical equilibrium, one half of this accelerating torque, then the efficiency of the device during steady operation is 97%. At this operating point the coupler regulation is good; a change of ±20% in load results in less than a 1% deviation in output angular velocity from the value at the operating point.

The number of tubes in each layer and the other physical characteristics of the system are chosen so that the layer having the torque characteristic of the form of the curve for $\beta=1$ in FIGURE 14 contributes most of the starting torque. The layer with the torque characteristic $\beta=10$, which peaks at an output rotational speed 0.9 of the input speed, contributes most of the torque at the operating speed. The physical characteristics of the tubes of each layer and the liquids they contain are identical with those listed in Table I for $\beta=1$ and $\beta=10$. The input angular velocity is 1800 r.p.m. The inner layer is composed of nine tubes; five with dimensions $\rho=1.9$ cm., $\zeta=2.5$ cm. and four with dimensions $\rho=1.9$ cm., $\zeta=1.9$ cm. The outer layer consists of four tubes all with dimensions $\rho=2.5$ cm., $\zeta=3.1$ cm. From these specifications, the values of $M_r$ for the layers are computed as $1.20(10)^7$ for the inner layer and $1.30(10)^6$ for the outer layer. Upon combining these values of $M_r$ with the $Q_0$'s for each layer (obtained from the graph of FIGURE 15) and with the $Q/Q_0$ values from FIGURE 14 the values of the torques for each layer of tubes can be computed as a function of the parameter $\delta$ (the ratio of output to input angular velocity). When this is accomplished the graph of FIGURE 16 results.

It should be noted that the value of the retarding or frictional force constant $r$ is ten times larger for the tubes of the inner layer compared to the tubes of the outer layer. This is accomplished by using a liquid of correspondingly higher viscosity in the tubes of the inner layer. Another method of realizing the same value of $\beta$ for the tubes of the outer layer would involve increasing the cross-sectional area of the tubes by a factor of ten. This would permit use of the same liquid in both layers of tubes. The increase in the value of $r$ for the liquid of the outer layer would, however, require that less tubes be used in that layer. Since only four are used in the design illustrated it is obviously impractical to decrease the number. A decrease would, however, be feasible in a scaled model of considerably larger capacity since the number of tubes per layer is directly proportional to the radius of the rotor for such scaled designs.

It should also be noted that designs with tubes widely spaced within the layers do not represent the most compact arrangements i.e., smallest size, for transmitting a given power or torque.

In scaling up the size of couplers which contain layers of tubes of different characteristics, for example, different cross sectional areas, shapes or included liquids, it may be advantageous to alternate the different types of layers either singly or in groups, depending upon the characteristics desired.

The design graphs and formulas herein next discussed apply to the flow conditions of complete turbulence. Under such conditions the frictional force resisting flow is proportional to the square of the mean velocity of flow, as explained in the mentioned article by L. F. Moody, supra.

It is convenient to introduce a number of new symbols in order to exhibit the relations in compact form and to facilitate numerical computation. The subscript $k$ is omitted from symbols since all expressions in this section refer to a single layer of tubes. Let the symbol $$\Phi=\frac{2J_t}{m_t}\frac{s/\sigma}{(g_0/g_s)} \tag{24}$$

where $s$ represents the retarding or frictional force constant for complete turbulent flow.

Then, let the symbol $$q=SH=\Phi/(1-\delta) \tag{25}$$

where S represents a parameter which depends upon the rotational speed of the spin-shift, the frictional force constant and the mass of transfer medium per unit length of the tube.

Let $P(q)$, $P_0$ and N be defined as follows $$P(q)=\int_{\theta_0}^{\theta_0+\pi} u_q(\theta)\cos\theta d\theta \tag{26}$$

$$P_0=P(q)|_{\delta=0}=P(\Phi) \tag{27}$$

and $$N=(g_0/g_s)\left(\frac{2\omega_i^2}{\pi}\right)nJ_t\left(\frac{2J_t}{m_t}\right) \tag{28}$$

Then from Equations 2 and 5 for a single layer $$T_0=NP_0\left(\frac{P}{P_0}\right) \tag{29}$$

The quantity $P/P_0$ completely determines the shape of the torque characteristic as a function of output angular velocity. This quantity is independent of the size of the coupler. The power or torque handling capacity is determined primarily by the quantity N. The quantities just introduced are, of course, defined for a single layer of tubes. The form of the expression for N given by Equation 28, indicates that for multilayer rotors, scaled as discussed in the previous section, the torque and power handling capacity vary roughly as the fifth power of the equatorial diameter of the rotor. Since the quantity P is also dependent on size, the scaling relationship is not as simple as in the laminar flow case.

For tubes of circular configuration (designated by the subscript $c$ as in FIGURE 12$a$)

$$J_t=\pi\sigma\rho^2 \text{ and } 2\,J_t/m_t=\rho$$

and therefore $$\Phi_c=\frac{s/\sigma}{g_0/g_s} \qquad (30)$$

and $$N_c=2n(g_0/g_s)\omega_i^2\sigma\rho^3 \qquad (31)$$

For tubes with a rectangular configuration (designated by the subscript $r$, as by FIGURE 2$b$)

$$J_t=4\sigma\rho\zeta \text{ and } 2J_t/m_t=2\rho\zeta/\rho+\zeta$$

and therefore $$\Phi_r=\frac{2\rho\zeta}{\rho+\zeta}\,\frac{s/\sigma}{g_0/g_s} \qquad (32)$$

and $$N_r=\frac{16}{\pi}n(g_0/g_s)\omega_i^2\sigma\frac{\rho^2\zeta^2}{\rho+\zeta} \qquad (33)$$

The torque expressions are (single layers)

$$T_0=N_cP_0(\Phi_c)\frac{P(q_c)}{P_0(\Phi_c)} \qquad (34)$$

for the circular configuration ($q_c=\Phi_c/1-\delta$) and $$T_0=N_rP_0(\Phi_r)\frac{P(q_r)}{P_0(\Phi_r)} \qquad (35)$$

for the rectangular configuration ($q_r=\Phi_r/1-\delta$).

An expression for the friction force constant $s$ is obtained from the Darcy formula (region of complete turbulence). This formula is given in the above-mentioned Moody article as $$h_f=f\frac{L}{d}\,\frac{v^2}{2g} \qquad (36)$$

where $h_f$ is the loss of head in friction, $f$ is the friction factor (see FIG. 17) L is the length of the pipe section, $d$ is its internal diameter, $v$ is the mean velocity of flow and $g$ is 980 cm./sec.$^2$ if c.g.s. units are used. The friction factor $f$ is dimensionless. In the region of complete turbulence $f$ is a constant for the particular pipe. The magnitude, $w$, of the force of frictional resistance for the length L is directly related to the loss of head, $h_f$ by $$w=\frac{\pi d^2}{4}g\Psi h_f \qquad (37)$$

where $\Psi$ is the density of the liquid.

By eliminating $h_f$ between Equations 36 and 37, the following result is obtained:

$$\frac{W}{L}=\frac{\pi}{4}fd\Psi v^2 \qquad (38)$$

The friction constant $s$ is related to the magnitude of the resistance force by $$w/L=sv^2 \qquad (39)$$

From Equations 38 and 39 it therefore follows that $$s=\frac{\pi}{8}d\Psi f \qquad (40)$$

The friction factor $f$ is exhibited as a function of the two dimensionless parameters: Reynolds number, $$R(R-vd/\nu)$$

and the relative surface roughness, $\epsilon/d$, and is shown by FIG. 17. In the region of complete turbulence, $f$ varies only with the relative surface roughness. The quantity $s$ is, therefore, independent of the velocity of flow as assumed in the analysis. For drawn tubing the surface roughness characteristic $\epsilon$ is approximately 0.00015 cm. and for commercial steel pipe $\epsilon\simeq0.003$ cm. These specific values are quoted here for the purpose of conveying a physical impression of the types of pipe surface which correspond to specific values of $\epsilon$.

In designing couplers to operate under turbulent flow conditions, it is not necessary to limit the design to surface roughnesses exhibited by currently available pipes. It is expected that a wide range of surface roughnesses can be realized by appropriate treatment of the interior surface of the tubes. To insure complete turbulent flow conditions, the Reynolds number must lie above some minimum range of values which is dependent upon the relative surface roughness of the tubes. The relationship between surface roughness and this "minimum" value is indicated by the dotted curve of FIGURE 17.

From the analysis of the steady state operation of the coupler, it follows that the flow of the liquid in the tubes is periodic. The liquid reverses its direction of flow for each half revolution of the rotor about the spin axis. The flow velocity thus goes to zero twice per revolution of the rotor. In the analysis as herein given it is assumed that the frictional force resisting the flow is proportional to the square of the mean flow velocity over the complete cycle. It is also assumed that this analysis is applicable to couplers operating under conditions such that the Reynolds number corresponding to the maximum amplitude of the flow velocity is considerably greater (of the order of five times or more) than the "minimum" Reynolds number at which complete turbulence is realized under the conditions of steady flow. It should be noted that laminar flow is not realized immediately when the mean flow velocity drops to a value such that the Reynolds number is in the laminar flow range for steady flow conditions. The time for the decay of turbulence may be longer than the interval during which the Reynolds number falls in the laminar flow range. It is apparent from the graph of FIGURE 17 that the value of $f$ changes relatively slowly as the transition zone is penetrated from the high Reynolds number side. Consequently, it is possible to place a dotted curve considerably to the left of the one shown in FIGURE 17 to represent the relationship between relative surface roughness and "minimum" Reynolds number, should a somewhat less accurate description of the performance of the system be acceptable.

In order to determine the torque from Equation 29, it is necessary to evaluate the function $P(q)$ defined by Equation 26. The evaluation of this integral expression follows after the function $u_q(\theta)$ has been computed. The Reynolds number at the maximum mean velocity of flow is computed from the maximum value of $u_q(\theta)$.

The function $P(q)$ is graphically presented in FIGURE 19 as a function of the variable $q$. The torque characteristics of single layer couplers operating under turbulent flow conditions for a variety of values of $\Phi$ are given in FIGURE 18.

The torque characteristics of FIGURE 18 bear some resemblance to the torque characteristics of FIGURE 14 for laminar flow. However, a major difference, which is of considerable practical interest, is the increased steepness of the curves as $\delta$ approaches unity. This is a distinct advantage for increasing both regulation and operating efficiency. As a specific example, compare the torque characteristics for $\Phi=0.5$ (turbulent flow case) and $\beta=3$ (laminar flow case). These curves are quite similar for values of $\delta$ up to the peak value and the maxima are also approximately equal. Operation at 80% of starting torque implies an operating efficiency of about 91% for the laminar flow case, $\beta=3$, but operation at 80% of starting torque for the turbulent flow case, $\Phi=0.5$, implies an operation efficiency of about 97%. The regulation is also better for the turbulent flow case. It is, of course, possible to design couplers operating under turbulent flow conditions, to exhibit one of a wide variety of torque characteristics other than a member of the family of curves illustrated in FIGURE 18. This can be accomplished, as illustrated above in the laminar flow case (FIGURE 16), by designing a multilayer rotor with different torque characteristics (from the family of FIGURE 18) for the different layers. One specific example will now be given to illustrate the size of rotor required to transfer a specific amount of power in the turbulent flow case. For comparison with the laminar flow examples, the rotor size and shape, the coupler gear ratio and the input rotational speed are taken as those of coupler No. 4″ of Table I. However, under these conditions in order to bring the operation into the range of complete turbulence, it is necessary to choose a liquid of considerably lower kinematic viscosity.

Murcury is a suitable liquid for the rotor for this example. The value of the surface roughness is taken as $\epsilon=0.02$ cm. The calculations are summarized in Table II immediately following.

this maximum value the peak value $v_m$ of the flow velocity is computed from $$v_m=\frac{2J_t}{m_t}\omega_i u_{qm} \tag{41}$$

and the maximum Reynolds number, $R_m$, is then given by $$R_m=v_m d/\nu \tag{42}$$

For the example given in Table II, above, the value of $u_{qm}$, at operating speed, in the outer layer of tubes ($\rho=25$, $\zeta=31$) is 0.16 from FIGURE 20. Since $2J_t m_t=2\rho\zeta/(\rho+\zeta)$ for tubes of the rectangular configuration is follows from (41) that $v_m=790$ cm./sec. and $R_m=4.6(10)^5$. From FIGURE 17 it is clear that for a Reynolds number one-fifth of this value, for the same value of relative roughness, the value of $f$ is not appreciably different from 0.030. Therefore, in agreement with the criterion previously discussed herein it is assumed that the complete turbulence analysis is approximately applicable to this example.

Referring now to FIGURE 9, there is shown in that figure a further modified form of the present invention in which novel means are provided for controlling the lag or lead of the oscillating transfer medium. In this instance, an input shaft **24*b* is journaled in a standard 16*b* forming a part of a support 12*b* which has a base 14*b* and a parallel standard 18*b* for supporting an output shaft 48*b***. Similar to the arrangement of FIGURE 2, there is

TABLE II

*Rectangular tube configurations filled with mercury*

$\epsilon=0.02$ cm. | $g_o/gs=4.0$
$d=0.58$ cm. | $\omega_i=190$ rad./sec.
$\epsilon/d=0.035$ | $\omega_o=188$ rad./sec.
$f=0.030$ | $\delta=0.99$
$s/\sigma=f/d=0.052$ cm.$^{-1}$ | $\nu=(10)^{-3}$ poises/gram/cm.$^3$
$\sigma=3.56$ gr./cm. | Number of tube layers=10

| Tube Dimensions | Number of Tubes | $\Phi_r$ | $q_r$ | $P(q_r)$ | $N_r$ | $\omega_o N_r P(q_r)$, ergs/sec. |
|---|---|---|---|---|---|---|
| Inner Layer: | | | | | | |
| $\rho=19$, $\zeta=19$ | 40 | 0.247 | 24.7 | 0.33 | $1.79(10)^{11}$ | $1.11(10)^{13}$ |
| $\rho=19$, $\zeta=25$ | 50 | 0.281 | 28.1 | 0.31 | $3.34(10)^{11}$ | $1.95(10)^{13}$ |
| Outer Layer: | | | | | | |
| $\rho=25$, $\zeta=25$ | 60 | 0.325 | 32.5 | 0.29 | $6.10(10)^{11}$ | $3.33(10)^{13}$ |
| $\rho=25$, $\zeta=31$ | 60 | 0.360 | 36.0 | 0.28 | $8.36(10)^{11}$ | $4.40(10)^{13}$ |

Average value of $\sigma_o N_r P(q_r)$ per layer of tubes $2.5(10)^{13}$ ergs/sec.
Rotor Radius (equator)—26 cm. (this value is dependent on the design details).
Operating efficiency—99%.
Operating power (estimated)—$2.5(10)^7$ watts.

The output operating speed is taken as 99% of the input speed which implies an operating efficiency of 99% (neglecting friction in the bearings and gears). Since the details of design will considerably affect the calculated values of $\omega_o N_r P(q_r)$ the value of this quantity for each of the layers of tubes will not be computed separately for this illustration. From an examination of the last column of the table, an average value of approximately $2.5(10)^{13}$ ergs/sec. per layer is estimated. Therefore, for the entire rotor, the power transferred at operating speed is about $2.5(10)^7$ watts. The radius of the rotor is 26 cm. The coupler transmits approximately $2.5(10)^7$ watts of power at the operating speed. This is very nearly the same power handling capacity of the same size rotor operating under laminar flow conditions with a much higher kinematic viscosity liquid (see Example No. 4″ of Table I). Multilayer couplers operating under turbulent flow conditions can be designed in a fashion similar to that described earlier for laminar flow operation. A wide variety of torque characteristics can be realized.

The maximum value $u_{qm}$ of the function $u_q(\theta)$, which is basic to the evaluation of the maximum Reynolds number, is shown as a function of $q$ in FIGURE 20. From connected to the input shaft **24*b* a yoke 16*b* having arms or tines 30*b* and 32*b*. A shaft 38*b* is journaled in bearings 34*b* and 40*b* in the arms 30*b* and 32*b*, respectively. At one end of the shaft 38*b* is a driving gear 44*b* arranged in mesh with a driven gear 46*b* affixed to the output shaft 48*b*. As in the form of the invention of FIGURE 2, the rotational speed of the shaft 38*b* is determined by the properties of the transfer medium contained within the fluid paths of tubes 64*b* which, of course, are similar in function to the tube 64** of FIGURE 2. In this form of the invention, just one series of circumferentially spaced fluid paths are utilized, it being understood that the use of a plurality of series of fluid paths is contemplated. In the form of the invention shown in FIGURE 9, the transfer medium is desirably of such a nature as to be influenced by a magnetic field or an electric field. In the alternative, the fluid may be of the type whose viscosity changes with an electric field. Also, an electric field, which produces a current in the transfer medium, may be employed in conjunction with a magnetic field which exerts a force on the transfer medium. If desired, a magnetic field may be used alone. It will be appreciated that the medium may include a liquid metal, such as mercury or the like, nickel, lithium, suitable sodium potassium alloys, a suspension of metal particles, or a plurality of metal balls or suspended particles of limited diameter capable of flow.

In the form of the invention of FIGURE 9, the shaft **38*b* is hollow. Surrounding the upper polar area, as viewed in FIGURE 9, of the tube 64*b* are pole pieces 77 and 79 while pole pieces 78 and 80 surround the lower polar area, as viewed in the same figure. Extending outwardly symmetrically from the arm 30*b* are pairs of brackets 81 and 82 (only one pair being shown), the outer ends of which terminate in pole pieces 83 and 84, respectively. A winding 85 is continuously wound about the pole pieces 83 and 84 and is connected by means of conductors 86 and 87 which in turn are connected to brushes 94 and 95 mounted in conductor relation with slip rings mounted on the shaft 24*b*. Electrical current is supplied to suitable slip rings on the shaft 24*b* from a suitable electrical power source, through conductors 94*a*, 94*a'* and 96. The flow of current may be controlled by any form of current regulator, such as that shown by rheostat 97. It will be appreciated that the source of electrical current in practice would be preferably a high energy source and rather than the conventionally represented rheostat 97**, a suitable current regulator would be provided.

The upper end of the shaft **38*b*, as viewed in FIGURE 9, is provided with an armature 89 disposed between the pole pieces 83 and 84, the ends of which are preferably concave to afford a limited gap. The armature 89 has windings 90 and 91 in which is electromagnetically induced a flow of current upon energization of the winding 85. The winding 90 is electrically connected, by means of conductors 101 and 102, passing through hollow shaft 38*b*, to a winding 103 surrounding the pole piece 77 and to winding 104 surrounding the pole piece 78. Winding 91 is electrically connected, by means of conductors 105 and 106, to windings 107 and 108 surrounding pole piece 79 and 80**, respectively.

Also arranged adjacent to the polar areas of the fluid paths **64*b*, in a position approximately 90° to the relative location of the pole pieces 77 and 79 are a pair of electrodes 110 and 111. Similarly arranged with respect to the pole pieces 80 and 78 are electrodes 110*a* and 111*a*. Current is supplied to the electrodes 110, 111, 110*a* and 111*a* by means of conductors 112 and 113 positioned within the hollow shaft 38*b*. Current is supplied to the conductors 112 and 113 by means of conductors 116 and 117 which are schematically illustrated in this figure, it being understood that these conductors are secured to the yoke 26*b* for rotation therewith. It will be apparent that the current supplied to the electrodes 110, 111, 110*a* and 111*a* may be controlled by the regulator 97 to control the electrical current density in the fluid paths or tubes 64*b*, only one of which being represented in FIGURE 9. In so controlling the current in the circuit of the electrodes 110, 111, 110*a* and 111*a*, the current in the winding 85 may be regulated. By this arrangement, a magnetic field is produced by the pole pieces 77 and 79 and an electric current perpendicular to the magnetic field of the pole pieces, is also created, both of which being effective to control the flow of medium within the paths 64*b*. Since the magnetic field produced by the pole pieces 78 and 80 is at right angles to the direction of current flow from the electrodes 110*a* and 111*a* and in the medium within the tube 64*b* the combination may be utilized either to accelerate or retard the flow of transfer medium within the tube or path 64*a***.

It will be noted that with each rotation of the shaft **38*b* relative to the pole piece 83 and 84, the direction of current flowing in the windings 103 and 107 is reversed and, likewise, the direction of current flowing in the windings 104 and 108 will likewise be reversed. With the windings arranged as illustrated, the current flow through the windings 103 and 104 is in the same direction as the current flow in the windings 107 and 108. In the position of the shaft 38*b* indicated in FIGURE 9, it may be assumed that the pole piece 77 is, in this position, the south pole and the pole piece 79 the north pole. In this event, the magnetic field extends between these two elements and is represented by an arrow extending upwardly, as viewed in FIGURE 9. The direction of force on the medium in the tube 64*b* can be established by determining the direction in which the current flows between the pairs of electrodes 110 and 111 and the electrodes 110*a* and 111*a*. It will be apparent that the phase characteristics of the flow of the medium in tube 64*b* can be varied by reversing the direction of the current or of the magnetic field and varying their magnitudes. To balance the yoke 26*b*, the arm or tine 32*b*** may be suitably weighted, as required.

Referring now to FIGURE 10, there is shown in that figure a modified form of the present invention in which a support **12*c* having a base 14*c* and spaced parallel standards 16*c* and 18*c*. In input shaft 24*c* is journaled in the standard 16*c* and affixed to this input shaft is a yoke 26*c* having spaced parallel tines or arms 30*c* and 32*c* in which is journaled a shaft 38*c*. Affixed to the shaft 38*c* is a drive gear 44*c* in mesh with a driven gear 46*c* affixed to an output shaft 48*c*. In this form of the invention, the shaft 38*c* is formed at one end with longitudinal passages 125 and 125*a*. Similarly, at the other end of the shaft 38*c* are formed longitudinal passages 125*b* and 125*c*. Connecting the passages 125 and 125*b* and the passages 125*a* and 125*c* are diagrammatically represented tubes or passages 64*c*. Heat exchange chambers 127, having radiation fins 128 are mounted at each end of the shaft 38*c*. By this arrangement, heat generated in the flow of transfer medium in the path or tube 64*c* is removed to the chambers 127** for heat exchange to the atmosphere. The medium may be assumed to flow, for purposes of this description, in a direction generally represented by the arrows. Cooling of the medium in this manner affords a degree of control over the viscosity of the medium, as will be appreciated.

In the form of the invention illustrated in FIGURE 13, only a rotor is illustrated, it being understood that shaft **38*d* is journaled in a suitable yoke as in the other forms of the invention. In this instance, however, the rotor takes the form of a substantially spherical shell 175 having suitable openings for the ends of the shaft 38*d*. Surrounding the shaft 38*d* is a core 175*a* of a length less than the diameter of the shell 175, thus forming polar chambers 56*d* and 58*d*. Extending outwardly from the core 175*a* are a plurality of circumferentially spaced segmental partitions 173 dividing the interior of the shell 175 into a plurality of longitudinally extending passages each communicating with the polar chambers 56*d* and 58*d*. It will be appreciated that upon rotation of the shaft 38*d* about the axis of the input shaft, the transfer medium oscillates in the ducts formed by substantially diametrically opposed pairs of partitions 173**.

The graphs and formulae herein set forth permit the design of couplers of any desired power handling capacity with specified torque characteristics, either under laminar flow conditions or turbulent flow conditions. The condition of incomplete turbulence is not considered because of the number of variables and also because the design data for laminar and complete turbulent flow conditions are sufficient for the purposes of the present invention.

Referring to FIGURE 21, the differential coupler mechanism of the present invention is indicated generally by reference numeral 210 and includes a housing or casing 212 having an opening 214 for reception of an input drive shaft 216 which is journaled in bearing 218. Fixedly connected to the shaft 216 is a drive bevel gear 220 spaced from the housing 212 by a collar 222. At the left side of the housing 212, as viewed in FIGURE 21, is an opening 224 in which is received one end of a bearing tube 226 upon which is journaled a bevel gear 228 which is in mesh with the gear 220 and is connected to a tube 230. The tube 230 is also journaled on the bearing sleeve 226 and has connected thereto a cage or carrier 232 which is preferably cylindrical in configuration and has an end wall 234 through which the tube 226 extends, a circumferentially extending wall 236, and an end wall 238.

At the right side of the housing 212, as viewed in FIGURE 21, is an opening 240 through which extends an output shaft 242 journaled in a bearing 244. The shaft 242 has an enlarged portion 246 formed with an axial recess 248 in which is received a pilot bearing 250 for journaling a pintle 252, affixed to the end plate 238 of the carrier 232. Journaled on the enlarged portion 246 of the shaft 242 by means of bearing 254 is a bevel gear 256 having a boss 258. The gear 256 is an idler gear and its function is merely to achieve dynamic balance, as will be understood. In mesh with the gear 256 and the gear 228 is an idler bevel gear 260 which is mounted on a shaft 262 journaled in an opening 264 in the housing 212 by a bearing 266.

The cylindrical wall 236 of the cage 232 is formed with an opening 268 in which is received a sleeve bearing 270 within which is rotatably mounted a stub shaft 272 to the outer end of which is affixed a bevel gear 274. At a point diametrically opposed to the opening 268 is an opening 276 in which is received a sleeve bearing 278 upon which is journaled a beveled idler gear 280. Both the gear 274 and the gear 280 are in mesh with an output bevel gear 282 affixed to the enlarged portion 246 of the output shaft 242. Also, the gears 274 and 280 are in mesh with beveled idler gear 284 having a hollow boss 286 journaled on the tube 230 by means of sleeve bearing 288.

Upon application of torque to the input shaft 216, torque is applied to the output shaft 242 through the gears 220, 228, the cage 232, the gear 274, and the gear 282. Assuming an initial load on the shaft 242, the gear 274 initially advances upon the gear 282 with the result that the shaft 272 turns. As this occurs, the torque is transmitted by the operation of fluid coupler 290 in a manner hereinafter described.

Received within the sleeve bearing 224 is an output shaft 292 to which is affixed a bevel gear 294 which is illustrated as being in mesh with a bevel gear 296 affixed to the shaft 272 which extends through the fluid coupler mechanism 290 and is journaled in pilot bearing 278. Also in mesh with the gear 294 is a beveled idler gear 298 journaled on the sleeve bearing 270 and in mesh with gear 298 is beveled idler gear 300 having a hollow boss 302 journaled by means of sleeve bearing 304 on a stub shaft 306 extending inwardly from the end plate 238 of the cage 232 and coaxial with the shaft 252 and the shaft 292.

Drive may be imparted to the output shaft 292 through rotation of the shaft 272 after the entire shaft 272 has been rotated about the axis of the output shaft 242 and 292. Differentiation is afforded by the relative movement of the gear 274 with respect to the gear 282. For instance, assuming that the gears 274 and 282 are rotating at substantially the same speed and it is required that there be a difference in speed between the output shafts 242 and 292, the relationship of the gear 274 with respect to the gear 282 is changed. In particular, if the present differential fluid coupler is mounted in a vehicle having wheels driven by the output shafts 242 and 292 and the vehicle turns a corner calling for faster rotation of the shaft 292 than the shaft 242, the rotation of the gear 282 is relatively retarded and the ratio of speed of gear 274 with respect to gear 282 is changed. Simultaneously the rotation of the shaft 272 on which the gear 296 is fixed results in relative increased rotational speed of shaft 292 by way of gear 294. In the event that it is desired that the shaft 242 rotate at a rate faster than the shaft 292, the rotation of the gear 282 is relatively advanced and the ratio of speed of gear 274 with the respect to gear 282 is changed. Simultaneously, the rotation of the shaft 272, on which the gear 296 is fixed, results in relatively decreased rotational speed of the shaft 292 by way of the gear 294.

The fluid coupler 290, as more fully described in applicant's co-pending application, has a pair of outer polar chambers 308 and a pair of coaxial inner polar chambers 310 and can in general include any number of such pairs of chambers and associated sets of paths for movement of transfer media. A plurality of substantially U-shaped tubes 312 afford fluid communication between the several outer polar chambers and, likewise, a plurality of substantially U-shaped tubes 314 provide communication between the several inner polar chambers 310. It will be noted that the tubes 312 are arranged circumferentially so that they form a discontinuous ring of a diameter greater than that formed by the tubes 314. While the operation of the fluid coupler 290 is described in detail in applicant's co-pending application and further described in the earlier part of this specification, it will be pointed out here that a supply of transfer medium, such as fluid or the like, is enclosed within a system including the tube 312 and the outer polar chambers 308 and, also, a supply of transfer medium, such as fluid or the like, is enclosed within a system comprising the inner tubes 314 and the inner polar chambers 310. As the shaft 272 is initially rotated by rotation of the gears 274 and 296 as these advance upon gears 282 and 294, which are the reaction members when a vehicle is at rest, the torque applied to the shaft 272 as the result of rotation of the cage 232 is caused by the precessional effect of the transfer media oscillating in the several fluid systems. The torque transfer is infinitely variable and is a function of the speed of the input shaft 216.

In FIGURE 22 is shown a further modified form of the present invention in which means are provided for selectively controlling the flow of fluid in tubes **64*d* (only one of which is shown) which are of the general type of tubes 64, 64*a*, 64*b* and 64*c*. In this instance, however, valve means 300 in the form of a damper rotatable from the position illustrated to a position obstructing the tube 64*d* by means of an electromagnet 302 having windings 304 and 306 connected to a suitable power source. By this arrangement, selective energization of the windings 302 and 306 tends to pivot the damper to a position perpendicular to the axis of the tube thus obstructing free flow of fluid and varying torque transmission characteristics of the coupling. It will be apparent that the fluid flow through the several tubes 64*d*** may be varied as described to obtain any desired torque transmission result.

In FIGURE 23 is shown another modified form of the present invention in which means are provided for selectively varying the flow of fluid along the fluid paths. In this instance a yoke tine **30*d* is apertured at 34*d* for reception of a stub shaft 38*d* journaled in bearing 36*d*. Affixed to the stub shaft 38*d* is an output gear 44*d* which functions in the same manner as the gear 44 of the principal form of the invention, as will be apparent. In this instance, however, the shaft 38*d* is formed with a central bore 308 and has affixed to the lower end thereof, as viewed in FIGURE 23, a polar chamber assembly 310 having sub-chambers 312 and 314. Sub-chamber 312 is formed with a plurality of circumferentially spaced circular openings 316 for reception of tubes 318, while sub-chamber 314 is formed with a plurality of circumferentially spaced circular openings 320 for reception of tubes 322. It will be appreciated that in the normal operation of the coupling with which the present fluid circuit is utilized, fluid flows across the sub-chamber 312 and through opposing tubes 318. Likewise, fluid flow through the sub-chamber 314, in oscillating fashion, through the tubes 322. According to this modified form of the present invention, means are provided for selectively obstructing the fluid flow through all of the tubes 318 or all of the tubes 322 or both the tubes 318 and the tubes 322 simultaneously. To this end, a cup shaped gate valve 324** is arranged within the sub-chamber 312 and is formed with a plurality of circumferentially spaced openings 326 corresponding generally in diameter with the openings 316. The gate valve 324 has a central shaft 328 extending through partition 330, separating the sub-chambers 312 and 314, and through a hollow shaft 332 forming part of a gate valve 334 having a plurality of circumferentially spaced openings 336 corresponding in diameter to the openings 320 in the sub-chamber 314.

At the lower end of the shaft 328 is a gear 336 with which is meshed a rack 338 connected to a solenoid 340 which is selectively energizable for rotation of the shaft 328 so that the gate valve 324 moves from the open position illustrated in FIGURE 24 to the closed position illustrated in FIGURE 25. By this arrangement, the tubes 318 may be obstructed in unison to vary the torque transmittal characteristics of the coupling.

Shaft 332 is formed with a gear 342 with which is meshed a rack 344 connected to a solenoid 346 which is selectively energizable for rotation of the shaft 332 from the open position to the closed position and vice versa, as will be apparent.

In FIGURE 26 is shown a modified form of the present invention in which means are provided for obstructing tubes 350 (only one of which is shown) in response to a speed condition incident to centrifugal force resulting from rotation of a coupling of the general type illustrated in the principal form of the invention. In this instance, the tubes 350 has a radial portion 352 within which are arranged in spaced relation spiders 354 and 356. Adjacent spider 354 is a valve seat 358. Suspended between the spiders 354 and 356, by means of springs 360 and 362, is a weight 364 which, at low rotational conditions, resides in the position illustrated. When centrifugal force reaches a predetermined value, the spring 362 is overcome so that the weight 364 flies outwardly to engage the valve seat 358 thus obstructing free passage of fluid in the tube 350.

In FIGURE 27 is shown a further modified form of the present invention, similar to FIGURE 22 but including an electromagnet, generally indicated by reference numeral 366 and including coils 368 and 370 arranged in series relation. A conductor 372 connects the coil 368 to a terminal 374 of a switch generally indicated by reference numeral 376 which also has a terminal 378 connected by means of conductor 380 to coil 370. The switch 376 is in series with a power source 382, schematically represented as being a battery, and has arms 384 and 386 selectively movable to engage the terminals 378 and 374, respectively. The arms 384 and 386 are also selectively movable to engage terminals 388 and 390 which are respectively connected to conductors 392 and 394, the opposite ends of which are connected to a coil 396 surrounding tube 398 within which is rotatably mounted a damper 400.

In operation, the electromagnets 366 and 370 may be energized by closing the switch 376 to engage the terminals 378 and 374. As a result, a force field is created between the coils 368 and 370 and the damper 400 moves to the position illustrated in dot and dash lines, in which position the flow of fluid through the tube 398 is obstructed. The operation of this modified form of the invention is similar to that of the device of FIGURE 22. In this form of the invention, however, means are provided for assuring the return of the damper 400 to the position illustrated in solid lines in FIGURE 27. This means takes the form of an electric field created by closing of the switch 376 in a way that the terminals 388 and 390 are contacted and the coil 396 is energized to create an electric field running substantially longitudinally of the tube 398.

The above described invention exhibits important advantages over power transmission couplers heretofore known. A salient advantage is, of course, the power capacity for a coupler of limited diameter. This effects extreme compactness especially in higher power units and, in addition, the present transmission mechanism may be produced efficiently and economically.

The foregoing detailed description has been given for clearness of understanding only, and no unnecessary limitations should be understood therefrom, as modifications will be obvious to those skilled in the art.

What is claimed is:

1. A hydrodynamic transmission comprising an input member, a rotatable shaft disposed in a plane normal to the axis of said input member, means driven by said input member for rotating said shaft, first gear means affixed to said shaft, second gear means in mesh with said first gear means, an output member affixed to said second gear means, a hydrodynamic coupling comprising substantially annular fluid-filled tubes mounted on said shaft, said tubes being rotatable simultaneously about the axis of said input member and about the axis of said shaft, so that the fluid oscillates in said tubes, and means for controlling the oscillation of the fluid while maintaining the speed of said input member at a predetermined level, whereby a nonzero average precessional force is created perpendicular to the axis of said shaft, said precessional force tending to exert torque on said shaft.

2. A hydrodynamic transmission comprising an input member, a shaft rotatable about the axis thereof and about an axis normal to the axis thereof, first gear means affixed to said shaft, second gear means in mesh with said first gear means, an output member affixed to said second gear means, a hydrodynamic coupling comprising at least one substantially annular fluid-filled tube arranged on said shaft whereby the fluid oscillates in said tube, means for introducing a force in the line of fluid flow to control the oscillation of the fluid so that a nonzero average precessional force normal to the axis of said shaft results.

3. A hydrodynamic transmission in accordance with claim 2 wherein a plurality of circumferentially spaced tubes are provided each coplanar with the axis of said shaft.

4. A hydrodynamic transmission in accordance with claim 2 wherein a plurality of tubes are provided each coplanar with the other and with the axis of said shaft.

5. A hydrodynamic transmission comprising an input member, a shaft rotatable about its own axis and also about an axis of rotation normal to its own axis, first gear means affixed to said shaft, second gear means in mesh with said first gear means, an output member affixed to said second gear means, a hydrodynamic coupling comprising means defining a substantially annular fluid-filled conduit, said conduit being mounted on said shaft and rotatable simultaneously about said axes so that the fluid in the conduit oscillates, means affording a retarding or accelerating force in the line of fluid movement along the axis of the conduit whereby a component of force is created normal to the axis of said shaft so that torque is applied to said output member in accordance with reaction conditions.

6. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, and means for affording retarding or accelerating forces in the direction of the fluid movement along the conduit so that a nonzero average force perpendicular to the axis of said shaft is obtained.

7. A hydrodynamic power transmission mechanism in accordance with claim 6 wherein means are provided for affording a plurality of substantially annular fluid-filled conduits.

8. A hydrodynamic power transmission mechanism in accordance with claim 7 wherein each of said conduits is substantially coplanar with the axis of said shaft.

9. A hydrodynamic power transmission mechanism in accordance with claim 7 wherein said conduits are substantially coplanar each to the other and to the axis of said shaft.

10. A hydrodynamic power transmission mechanism in accordance with claim 9 wherein said conduits are arranged at varying radial distances from the axis of said shaft.

11. A hydrodynamic power transmission mechanism in accordance with claim 9 wherein said conduits are arranged to form a first series of circumferentially spaced fluid conduits at a predetermined radial distance from the axis of said shaft and a second series of fluid conduits radially spaced from said first series.

12. A hydrodynamic power transmission mechanism in accordance with claim 11 wherein the conduits of said first series afford a different resistance to the flow of fluid than the conduits of said second series.

13. A hydrodynamic power transmission mechanism in accordance with claim 11 wherein the fluid of said first series is characterized by different flow characteristics than the fluid of said second series.

14. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, and means in each conduit for controlling the frictional constant of the fluid during movement along the conduits to control the movement of the fluid and the output of the coupling.

15. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, and electrical means for controlling the movement of fluid through said conduits to control the rate of flow thereof.

16. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, and electrical means operative upon energization to effect a change in phase of the oscillating medium so that an adjustable torque characteristic is attained.

17. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said last-named means being rotatable with said shaft so that the fluid oscillates in the conduit, and electro-magnetic means operative upon energization to effect a retarding force upon the fluid in said conduit so that the torque characteristic of said coupling is varied.

18. A hydrodynamic transmission comprising an input member, a shaft, means for positioning said shaft for rotation about the axis thereof and about an axis normal to said said first-named axis, said means being rotatable by said input member, first gear means affixed to said shaft, second gear means in mesh with said first gear means, an output member affixed to said second gear means, a hydrodynamic coupling comprising means defining a plurality of substantially annular fluid-filled conduits, said conduits being defined by a pair of fluid compartments mounted on said shaft symmetrically with respect to the axis of said input member and a plurality of substantially semi-annular tubes communicated with said compartments, said means being rotatable with said shaft so that the fluid oscillates in the conduits, and means for effecting a force on said fluid so that nonzero average forces are effected tending to rotate said shaft about the axis thereof in response to torque requirements of said output member.

19. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, means for effecting an electric field across said conduit to vary the flow characteristics of the fluid in said conduit and thereby vary the output characteristic of said coupling.

20. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, means for effecting a magnetic field across said conduit to vary the flow characteristics of the fluid in said conduit and thereby vary the output of said coupling.

21. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, hydrodynamic coupling comprising means defining a substantially annular fluid-filled conduit, said means being rotatable with said shaft so that the fluid oscillates in the conduit, means for effecting a magnetic field and an electric current across said conduit, said electromagnetic means and said electric current being variable in magnitude and oriented so that the output characteristics of said coupling may be controlled.

22. A power transmission comprising a drive shaft, a pair of driven shafts, means for affording differential movement between said driven shafts, means interposed between said drive shaft and said driven shafts for supplying torque as required, said last named means including a fluid coupler having a longitudinal axis and a transverse axis and including a pair of cylindrical compartments, one on each side of said transverse axis, a plurality of circumferentially spaced passages interconnecting said compartments, a fluid in said compartments and said passages, whereby upon rotation of said coupling about the transverse axis thereof the fluid oscillates in said passages to effect infinitely variable speed ratio and torque as desired, said passages comprising a first series of passages arranged circumferentially with respect to said longitudinal axis at a predetermined radial distance from said longitudinal axis and a second series of circumferentially disposed passages at a different radial distance from said longitudinal axis, wherein the passages of said first series are filled with a fluid of predetermined viscosity and the passages of said second series are filled with a fluid of different viscosity.

23. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said last-named means being rotatable with said shaft so that the fluid oscillates in the conduit, and electromagnetic means operative upon energization to effect an accelerating force upon the fluid in said conduit so that the torque characteristic of said coupling is varied.

24. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said last-named means being rotatable with said shaft so that the fluid oscillates in the conduit, and means for selectively varying the flow characteristics of the fluid in said conduit to vary the torque characteristics of said coupling.

25. A transmission in accordance with claim 24 wherein said last-named means takes the form of a valve in said conduit.

26. A transmission in accordance with claim 25 wherein electromagnetic means are provided for actuating said valve.

27. A transmission in accordance with claim 26 wherein electromagnetic means is provided for closing said valve and electrical means is provided for opening said valve.

28. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said last-named means being rotatable with said shaft so that the fluid oscillates in the conduit, and means responsive to the speed of rotation of said shaft for controlling the flow of fluid in said conduit.

29. A transmission in accordance with claim 28 wherein said last-named means includes a speed responsive weight movable under the influence of centrifugal force into engagement with a valve seat.

30. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a plurality of substantially annular fluid-filled conduits, said conduits being defined by a pair of fluid compartments mounted on said shaft symmetrically with respect to the axis of said input member and a plurality of substantially semi-annular conduits communicated with said chambers, said means being rotatable with said shaft so that the fluid oscillates in the conduits, and means for controlling the flow of fluid in said conduits so that nonzero average forces are effected tending to rotate said shaft about the axis thereof in response to torque requirements of said output member, said last-named means including a damper disposed in each of said conduits and selectively actuatable means for moving said damper from a position in which the fluid flows freely to a position in which fluid flow is obstructed.

31. A transmission in accordance with claim 30 wherein the means for actuating said damper is an electromagnet.

32. A transmission in accordance with claim 30 wherein the means for actuating said damper to said one position comprises an electric field and the means for moving said damper to said other position is a magnetic field.

33. A hydrodynamic transmission comprising an input member, a shaft, means for positioning said shaft for rotation about the axis thereof and about an axis normal to said first-named axis, said means being rotatable by said input member, first gear means affixed to said shaft, second gear means in mesh with said first gear means, an output member affixed to said second gear means, a hydrodynamic coupling comprising means defining a substantially annular fluid-filled conduit, said means being rotatable with said shaft so that the fluid oscillates in the conduit, said means including a pair of fluid compartments equally spaced from the axis of rotation of said shaft about the axis of said input member and a pair of substantially semi-annular conduits arranged to communicate with said chambers, and selectively actuatable means for controlling the flow of fluid through said compartments.

34. A transmission in accordance with claim 33 wherein said last-named means includes a gate valve arranged within at least one of said compartments.

35. A transmission in accordance with claim 34 wherein said gate valve is substantially cup shaped and is formed with a plurality of circumferentially spaced openings adapted to be moved into and out of register with corresponding openings in said compartment.

References Cited by the Examiner

UNITED STATES PATENTS

| | | | |
|---|---|---|---|
| 1,247,494 | 11/1917 | Berquist | 74—713 |
| 1,890,831 | 12/1932 | Smyth | 33—226 |
| 2,453,684 | 11/1948 | Cloete | 74—774 |
| 2,491,202 | 12/1949 | O'Hara | 74—752 |
| 2,808,740 | 10/1957 | Boden | 74—713 |
| 2,856,142 | 10/1958 | Haviland | 74—5.7 X |
| 3,083,578 | 4/1963 | Rosato et al. | 74—5.6 X |

FOREIGN PATENTS

| | | |
|---|---|---|
| 434,093 | 4/1948 | Italy. |

DAVID J. WILLIAMOWSKY, *Primary Examiner.*

DON A. WAITE, *Examiner.*

H. B. ROCKMAN, T. C. PERRY, *Assistant Examiners.*